(12) United States Patent
Kamijima

(10) Patent No.: US 7,802,357 B2
(45) Date of Patent: Sep. 28, 2010

(54) METHOD OF FORMING PLATING FILM, METHOD OF MANUFACTURING MAGNETIC DEVICE AND METHOD OF MANUFACTURING PERPENDICULAR MAGNETIC RECORDING HEAD

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 491 days.

(21) Appl. No.: 11/826,146

(22) Filed: Jul. 12, 2007

(65) Prior Publication Data
US 2008/0037181 A1    Feb. 14, 2008

(30) Foreign Application Priority Data
Aug. 8, 2006  (JP)  ............... 2006-216106

(51) Int. Cl.
G11B 5/187   (2006.01)
C25D 5/02    (2006.01)
(52) U.S. Cl. .......... 29/603.13; 29/852; 205/89; 205/95; 205/122; 427/128
(58) Field of Classification Search ......... 29/603.13, 29/603.14, 603.23, 603.25, 852; 205/89, 205/95, 122, 125; 427/97.8, 97.9, 128; 438/629, 438/639, 648
See application file for complete search history.

(56) References Cited

U.S. PATENT DOCUMENTS 5,969,422 A * 10/1999 Ting et al. ............... 438/648 X
6,047,462 A * 4/2000 Miyauchi et al. ......... 29/603.14

FOREIGN PATENT DOCUMENTS

| JP | A-06-215328 | 8/1994 |
| JP | A 11-25424 | 1/1999 |
| JP | 2000077360 A * | 3/2000 |
| JP | A 2001-23932 | 1/2001 |
| JP | A-2001-023932 | 1/2001 |
| JP | A 2005-281797 | 10/2005 |
| JP | A-2006-018985 | 1/2006 |
| JP | A-2006-201227 | 8/2006 |

* cited by examiner

Primary Examiner—A. Dexter Tugbang
(74) Attorney, Agent, or Firm—Oliff & Berridge, PLC

(57) ABSTRACT

A method of forming a plating film capable of improving magnetic properties is provided. A photoresist pattern, having a first opening with an aspect ratio greater than 1 and a second opening with an aspect ratio smaller than that of the first opening, is formed on a surface of a substrate. A seed film is formed to cover an exposed surface of the substrate in the openings and an inner wall of the photoresist pattern in the openings. On the seed film in the openings, the plating film of magnetic material is deposited such that the first opening is filled under application of a magnetic field in the direction intersecting the surface of the substrate, and the second opening is filled under application of the magnetic field in the direction along the surface of the substrate.

10 Claims, 20 Drawing Sheets

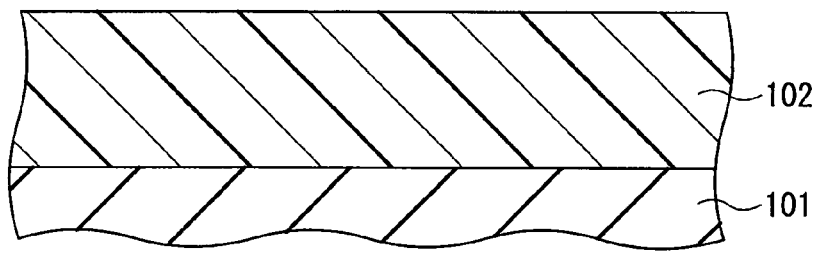
FIG. 1A
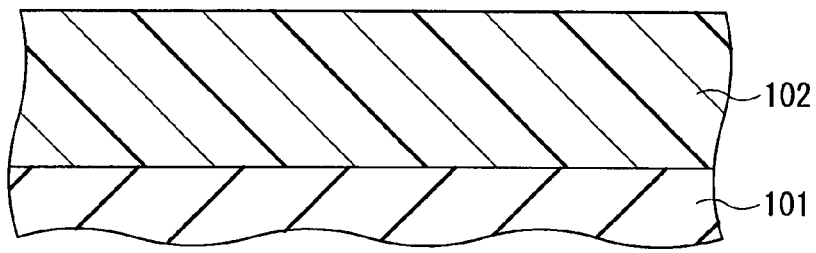
FIG. 1B
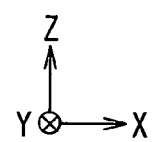

METHOD OF FORMING PLATING FILM, METHOD OF MANUFACTURING MAGNETIC DEVICE AND METHOD OF MANUFACTURING PERPENDICULAR MAGNETIC RECORDING HEAD

BACKGROUND OF THE INVENTION

1. Field of the Invention

The present invention relates to a method of forming a plating film having a high aspect ratio (thickness/width) portion and a low aspect ratio portion, and a method of manufacturing a magnetic device using such a plating film and a method of manufacturing a perpendicular magnetic recording head using such a plating film.

2. Description of the Related Art

In the field of manufacturing various devices, the frame plating method has been widely used as a method of forming fine patterns. The frame plating method includes: forming a seed film as an electrode film on a surface of a substrate; forming a frame (a pattern film having an opening) on the seed film; and depositing a plating film on the seed film in the opening.

In the field of manufacturing various magnetic devices, improved frame plating method (namely, damascene method, and the like) has been used in order to form a fine pattern having a portion with an aspect ratio (thickness/width) greater than 1 (a high aspect ratio portion). In perpendicular magnetic recording head as an example of magnetic devices, this kind of fine pattern has a feature of leading magnetic flux to a magnetic recording medium, and is a magnetic pole layer and the like with a fine width portion defining a recording track width of the magnetic recording medium. The improved frame plating method includes: forming a pattern film having an opening on a surface of a substrate; forming a seed film so as to cover the pattern film and an exposed surface of the substrate in the opening; and depositing a plating film on the seed film in the opening. In the improved frame plating method, the plating film in the opening deposits not only on the seed film formed on the exposed surface of the substrate, but also on the seed film formed on an inner wall of the pattern film. Therefore, the entire plating film can be formed in a short time.

In particular in the field of manufacturing various magnetic devices, when a plating film is formed from a magnetic material, the plating film is deposited while applying a magnetic field in a direction along the surface of the substrate in order to obtain superior magnetic properties in the plating film (for example, soft magnetic properties with permeability as μ and retention as Hc). This is because, intersecting of the application direction of magnetic field with the deposit direction of the plating film leads to improvement of magnetic properties in the plating film as known by experience. In this case, the application direction of the magnetic field employs the same direction as the application direction of the magnetic field in the general frame plating method as forming the pattern film after forming the seed film.

In the improved frame plating method, some related techniques have been known already. Specifically, in the field of manufacturing semiconductor devices, the following method has been proposed to form plating films with uniform film thickness. A pair of magnets with semiconductor wafer in between are provided. Then a plating film is deposited while applying the magnetic field in the direction along a surface of the semiconductor wafer (for example, refer to Japanese Unexamined Patent Publication No. 2001-023932).

Generally in the field of plating, a plating device capable of changing the application direction of the magnetic field in a surface of a substrate has been proposed (for example, refer to Japanese Unexamined Patent Publication No. 2005-281797). With this device, a problem concerning arrangement of elements constituting the plating device has been eased. In the field of manufacturing the magnetic head, such a magnetic field application device has been proposed that magnets or magnetic materials were inserted in adjustment holes provided at a pair of rare earth magnets of convex cross section with a plating tub in between (for example, refer to Japanese Unexamined Patent Publication No.Hei-11-025424). With this device, a magnetic head with low noise has been achieved.

SUMMARY OF THE INVENTION

However, there arises a problem that sufficient magnetic properties over the entire plating film are unobtainable when forming a fine pattern with a high aspect ratio portion as well as a low aspect ratio portion using the improved frame plating method.

In view of the foregoing, it is desirable to provide a method of forming a plating film, a method of manufacturing a magnetic device and a method of manufacturing a perpendicular magnetic recording head, all of them capable of improving the magnetic properties.

The method of forming the plating film according to an embodiment of the present invention includes first to third steps. The first step includes forming a pattern film having a first opening with an aspect ratio (depth/width) greater than 1 and a second opening with the aspect ratio smaller than the first opening. The second step includes forming the seed film so as to cover at least the exposed surface of the substrate and the inner wall of the pattern film in the first and the second openings. The third step includes depositing the plating film of magnetic materials on the seed film in the first and the second openings through a process of filling at least the first opening while applying the magnetic field in the direction intersecting the surface of the substrate and a process of filling at least the second opening while applying the magnetic field in the direction along the surface of the substrate. Also, the method of manufacturing the magnetic device according to an embodiment of the present invention is a method of manufacturing the magnetic device with the magnetic film. The method includes forming the magnetic film having a high aspect ratio (thickness/width) portion of the plating film filling the first opening and a low aspect ratio portion of the plating film filling the second opening, using the above method of forming the plating film. The method of manufacturing the perpendicular magnetic recording head according to an embodiment of the present invention is a method of manufacturing perpendicular magnetic recording head having the thin film coil generating the magnetic flux and the magnetic pole layer leading the magnetic flux generated in the thin film coil to the magnetic recording medium. Using the above method of forming the plating film, the magnetic pole layer is formed to have a magnetic pole portion with the high aspect ratio (thickness/width) of the plating film filling the first opening and a yoke portion with the low aspect ratio of the plating film filling the second opening.

In the method of forming the plating film, the plating film of magnetic materials is deposited in the first opening with the high aspect ratio and the second opening with the low aspect ratio. In this case, at least the first opening is filled while applying the magnetic field in the direction intersecting the surface of the substrate, and at least the second opening is filled while applying the magnetic field in the direction along the surface of the substrate. Therefore, the application direction of the magnetic field intersects the direction of a substantial deposit component of the plating film in both of the first and the second openings. The magnetic film in the method of manufacturing the magnetic device and the magnetic pole layer in the method of manufacturing the perpendicular recording head can also obtain the same effect.

According to an embodiment of the present invention, the method of forming the plating film may include a fourth step of planarizing the plating film until at least the pattern film is exposed. In the third step, the same magnetic materials may be used before and after changing the application direction of the magnetic field, or different magnetic materials may be used before and after changing the application direction of the magnetic field. In the first step, the inner wall of the pattern film may be inclined such that the widths of the first and the second openings gradually increase as the first and the second openings separate from the substrate (in this case, the maximum widths of the first and the second openings are widths defining the aspect ratio (depth/width)). The first step may include a step of forming a photoresist film on the surface of the substrate and a step of selectively exposing and developing the photoresist film to form the first and the second openings, thereby completing forming the pattern film. The first step may also include a step of forming a nonmagnetic film (except the photoresist film) on the surface of the substrate and a step of selectively etching the nonmagnetic film to form the first and the second openings, thereby completing the pattern film.

In the method of manufacturing the perpendicular magnetic recording head according to an embodiment of the present invention, the plating film is deposited to fill at least the second opening under application of the magnetic field in the direction of recording track width.

The method of forming the plating film according to an embodiment of the present invention includes the following to deposit the plating film of magnetic materials in the first and the second openings: forming the pattern film having the first opening with an aspect ratio (depth/width) greater than 1 and a second opening with the aspect ratio smaller than the first opening; filling at least the first opening while applying the magnetic field in the direction intersecting the surface of the substrate; and filling at least the second opening while applying the magnetic field in the direction along the surface of the substrate. As a result, the magnetic properties of the plating film can be improved. Also, the magnetic properties of the magnetic film in the method of manufacturing the magnetic device and the magnetic pole layer in the method of manufacturing the perpendicular magnetic recording head can be improved. The method of forming the plating film according to an embodiment of the present invention is applied to the method of manufacturing the perpendicular magnetic recording head. In this case, the magnetic properties can be further improved by applying the magnetic field in the recording track width direction when the plating film is deposited to fill at least the second opening.

Other and further objects, features and advantages of the invention will appear more fully from the following description.

BRIEF DESCRIPTION OF THE DRAWINGS

FIGS. 1A and 1B are cross sectional views illustrating a step in the method of forming the plating film according to an embodiment of the present invention.

DETAILED DESCRIPTION OF THE PREFERRED EMBODIMENTS

Hereinafter, preferred embodiments of the present invention will be described in detail with reference to the accompanying drawings.

A method of forming a plating film according to an embodiment of the present invention is described with reference to FIGS. 1A to 7. FIGS. 1A to 6B describe the method of forming the plating film, each of these showing a cross sectional configuration. FIG. 7 shows a perspective configuration of the plating film which is formed using the method of forming the plating film.

The method of forming the plating film is namely an improved frame plating method. In the method, the plating film is formed by using a pattern film having a first opening with an aspect ratio (depth/width) greater than 1 and a second opening with the aspect ratio smaller than the first opening. FIGS. 1A to 6A show a periphery configuration of the first opening and FIGS. 1B to 6B show the same of the second opening. The dimensions in X-axis and Z-axis direction in FIGS. 1A to 7 refer to width and depth (or thickness) hereinafter, respectively.

In the method of forming the plating film, photoresist is applied to a surface of a substrate 101 using, for example, the spin coating method as shown in FIGS. 1A and 1B. Then a photoresist film 102 is formed by heating (baking) the photoresist, if necessary. In addition, the substrate 101 may be various substrates or various films as long as the substrate 101 can support the photoresist film 102.

Figure 2A:
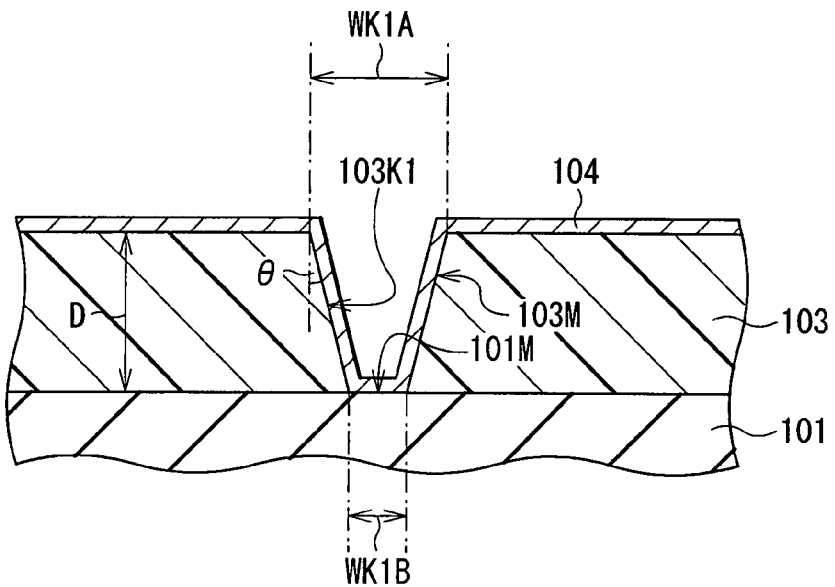
FIGS. 2A and 2B are cross sectional views illustrating a step following FIGS. 1A and 1B.
Figure 2B:
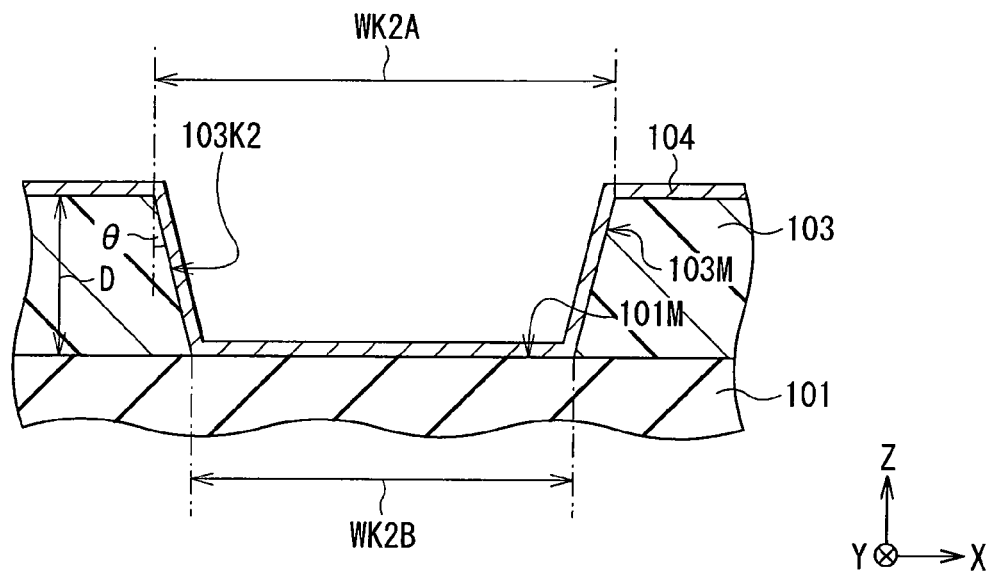

Next, a photoresist pattern 103 is formed as shown in FIGS. 2A and 2B by performing patterning (selectively exposing and developing) on the photoresist film 102 using the photolithography method. When forming the photoresist pattern 103, the photoresist pattern 103 is adapted to have an opening 103K1 with the aspect ratio (depth/width) greater than 1 as in FIG. 2A and an opening 103K2 with the aspect ratio smaller than the opening 103K1 as in FIG. 2B. In this case, for example, a depth D of the opening 103K1 is equal to the depth D of the opening 103K2. The aspect ratio of the opening 103K2 is smaller than 1 as well. Also, for example, the openings 103K1 and 103K2 are connected with each other. An angle of an inner wall 103M of the photoresist pattern 103 is inclined at a predetermined angle (an inclination angle θ) such that the widths of the openings 103K1 and 103K2 increase as a distance from the substrate 101. This inclination angle θ is an angle of the inner wall 103M to a perpendicular line of the surface of the substrate 101, and it can be set arbitrarily. Here, an upper end width WK1A of the opening 103K1 is larger than a lower end width WK1B. An upper end width WK2A of the opening 103K2 is larger than a lower end width WK2B as well. In this case, the aspect ratio in the opening 103K1 is represented as: the depth D/the maximum width WK1A. The aspect ratio in the opening 103K2 is represented as: the depth D/the maximum width WK2A. In addition, when the photoresist film 102 is exposed, various exposed sources such as steppers and scanners are usable.

Next, using sputtering method, vacuum evaporation method and the like, a seed film 104 is formed so as to cover at least the exposed surface 101M of the substrate 101 in the openings 103K1 and 103K2, and inner wall 103M of the photoresist pattern 103. Here, for example, the seed film 104 covers not only the inner wall 103M of the photoresist pattern 103 but also the upper surface thereof.

Figure 3A:
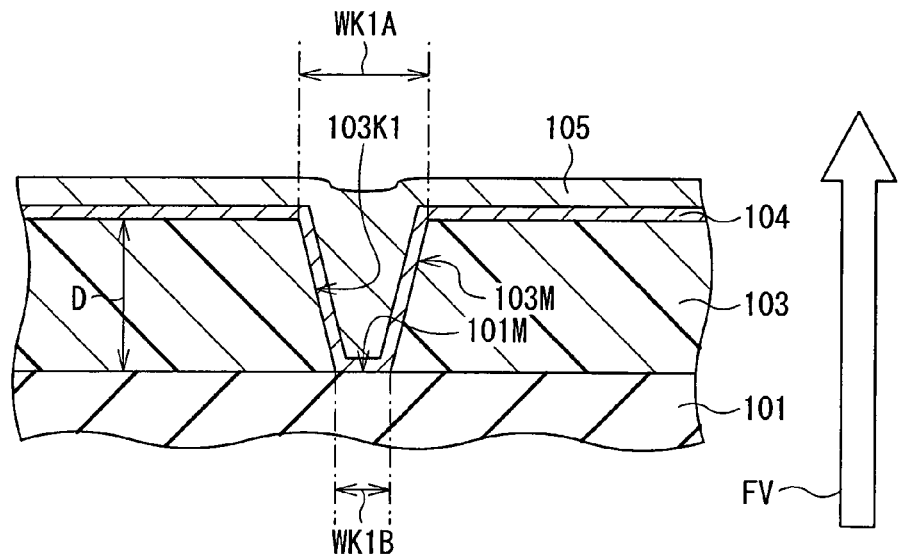
FIGS. 3A and 3B are cross sectional views illustrating a step following FIG. 2A and 2B.
Figure 3B:
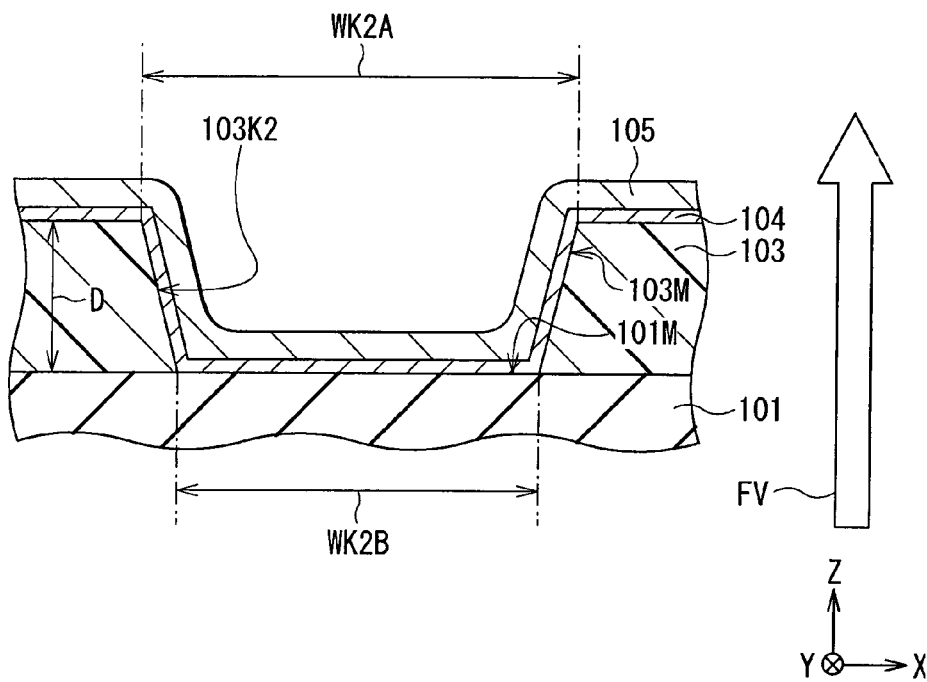
Figure 4A:
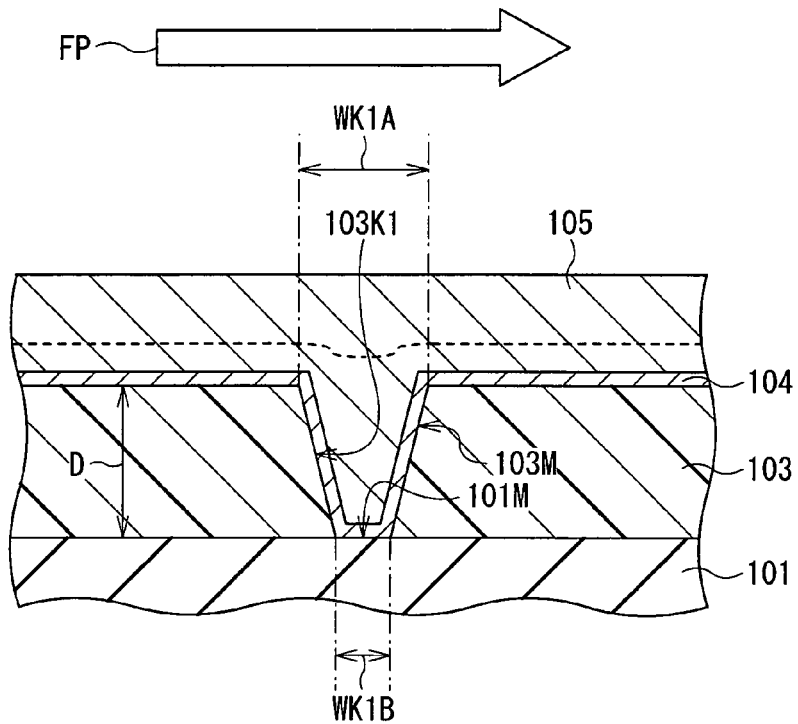
FIGS. 4A and 4B are cross sectional views illustrating a step following FIGS. 3A and 3B.
Figure 4B:
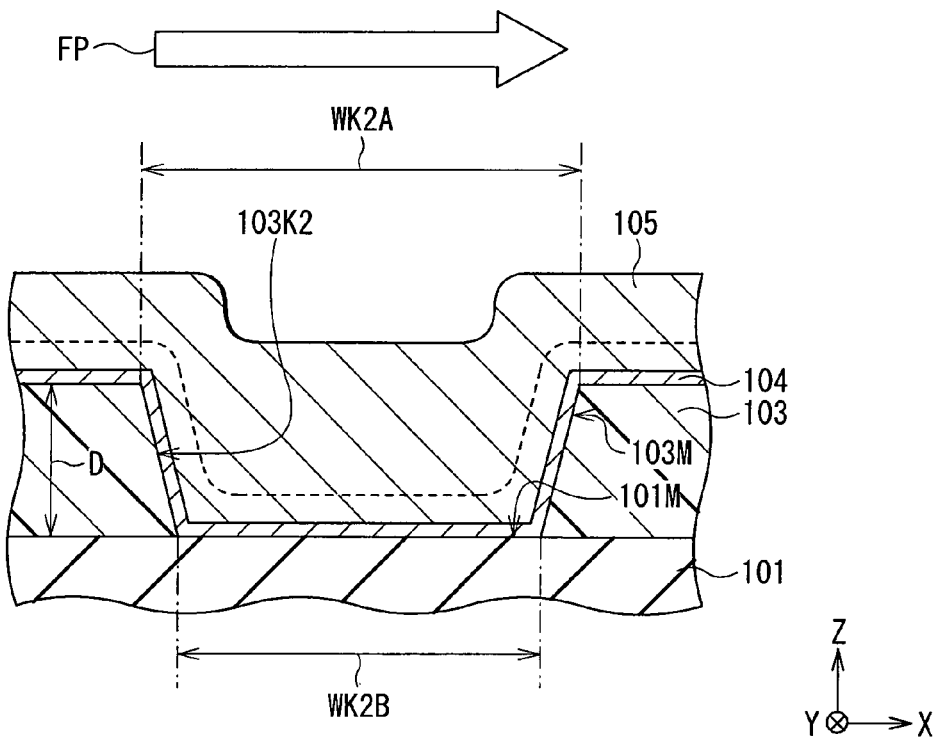

Next, as shown in FIGS. 3A to 4B, while applying the magnetic field, a plating film 105 of magnetic materials is deposited on the seed film 104 in the openings 103K1 and 103K2. As shown in FIGS. 3A and 3B, when the plating film 105 is deposited, a pair of Helmholtz coils (not shown) and the like disposed with the substrate 101 in between in the depth direction (Z-axis direction) are used. While applying the magnetic field in the direction intersecting to the surface of the substrate 101 (hereinafter, simply referred to "the magnetic field FV"), at least the opening 103K1 is filled. After that, as shown in FIGS. 4A and 4B, the other pair of Helmholtz coils (not shown) disposed with the substrate 101 in between in the width direction (X-axis direction) are used. While applying the magnetic field in the direction along the surface of the substrate 101 (hereinafter, simply referred to "the magnetic field FP"), at least the opening 103K2 is filled. Here, for example, the plating film 105 is deposited such that the opening 103K1 is filled and its periphery is covered while applying the magnetic field FV, and then the opening 103K2 is filled and its periphery is covered while applying the magnetic field FP. Types of magnetic materials and application intensity of the magnetic field can be set arbitrarily.

In the deposit process of the plating film 105, the capacity of the opening 103K1 is smaller than the capacity of the opening 103K2. Therefore, when the opening 103K1 is filled under application of the magnetic field FV (shown in FIG. 3A), the opening 103K2 is not completely filled yet (shown in FIG. 3B). The opening 103K2 is completely filled under application of the magnetic field FP (shown in FIG. 4B). That is, the opening 103K1 is filled with the plating film 105 deposited under application of only the magnetic filed FV. However, the opening 103K2 is filled with the plating film 105 deposited under application of the magnetic field FV and the plating film 105 deposited under application of the magnetic field FP as well. In addition, the broken lines in the plating film 105 in FIGS. 4A and 4B show boundaries between the plating film 105 deposited under application of the magnetic field FV and the plating film 105 deposited under application of the magnetic field FP. In other words, the broken lines show the changing positions of the application direction of the magnetic field. Here, for example, the same magnetic materials as the forming materials of the plating film 105 are used before and after changing the application direction of the magnetic fields. Thus the plating film 105 is formed as a single layer film.

Figure 5A:
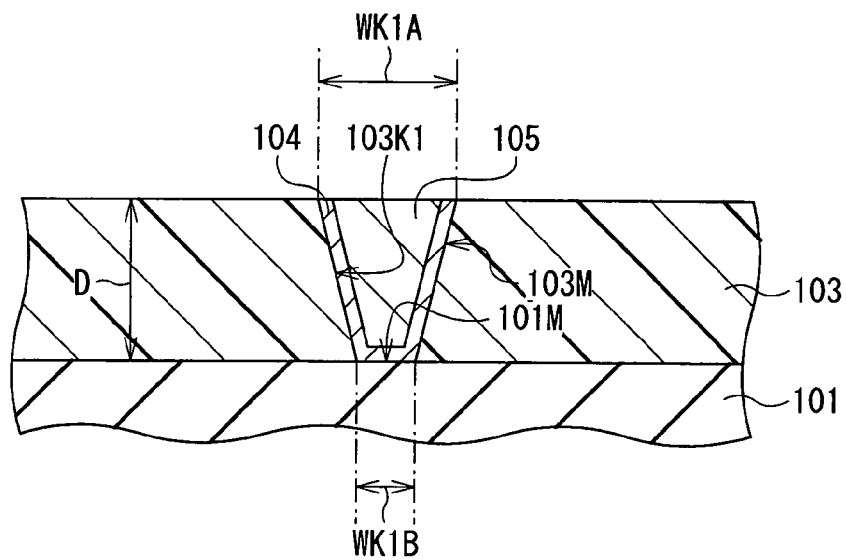
FIGS. 5A and 5B are cross sectional view illustrating a step following FIGS. 4A and 4B.
Figure 5B:
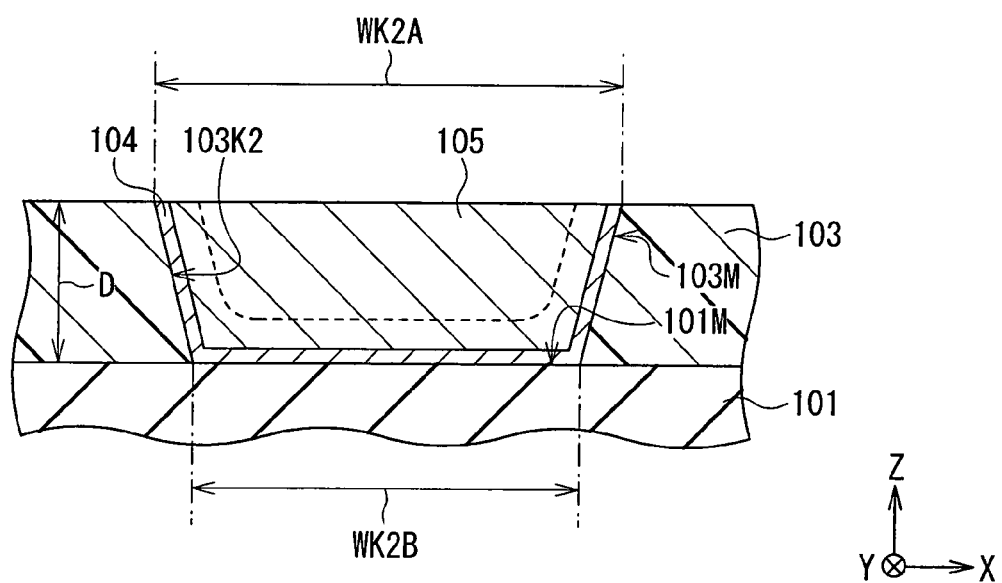

Next, using polishing method such as chemical mechanical polishing (CMP), the plating film 105 is planarized until at least the photoresist pattern 103 is exposed. Then, by partially removing the plating film 105 and the seed film 104, only the plating film 105 filling the openings 103K1 and 103K2 remain as shown in FIGS. 5A and 5B. In this case, the plating film 105 may be planarized succeedingly even after the photoresist pattern 103 is exposed. Thus the thickness of the plating film 105 is adjusted to obtain the desirable thickness.

Figure 6A:
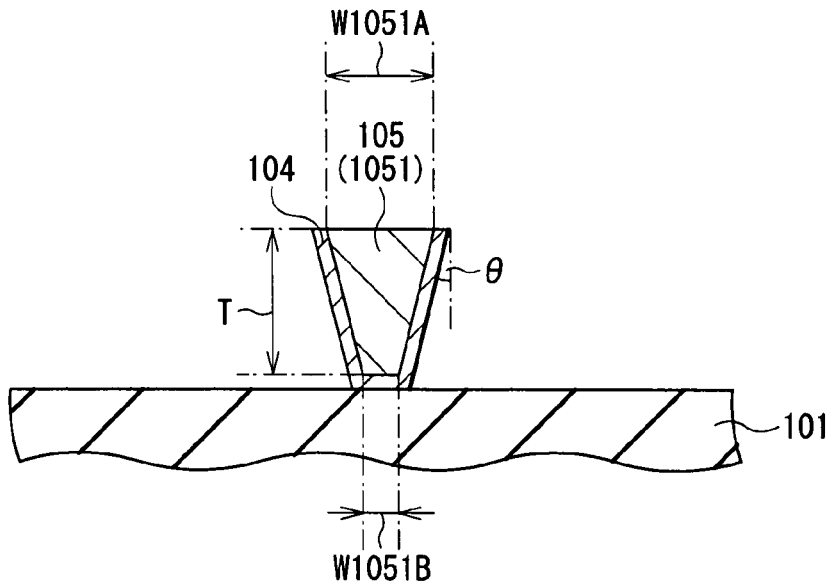
FIGS. 6A and 6B are cross sectional view illustrating a step following FIGS. 5A and 5B.
Figure 6B:
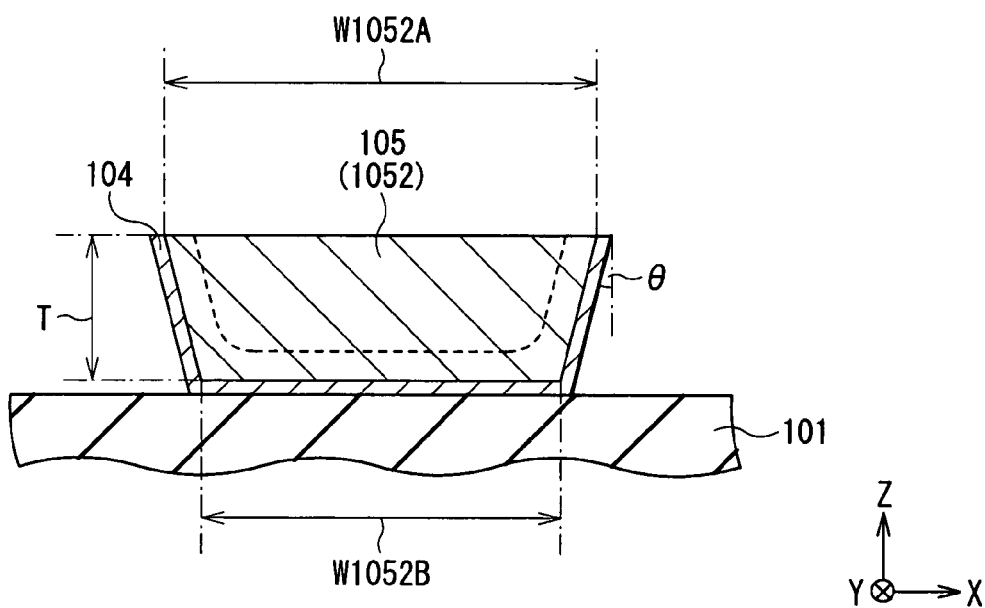
Figure 7:
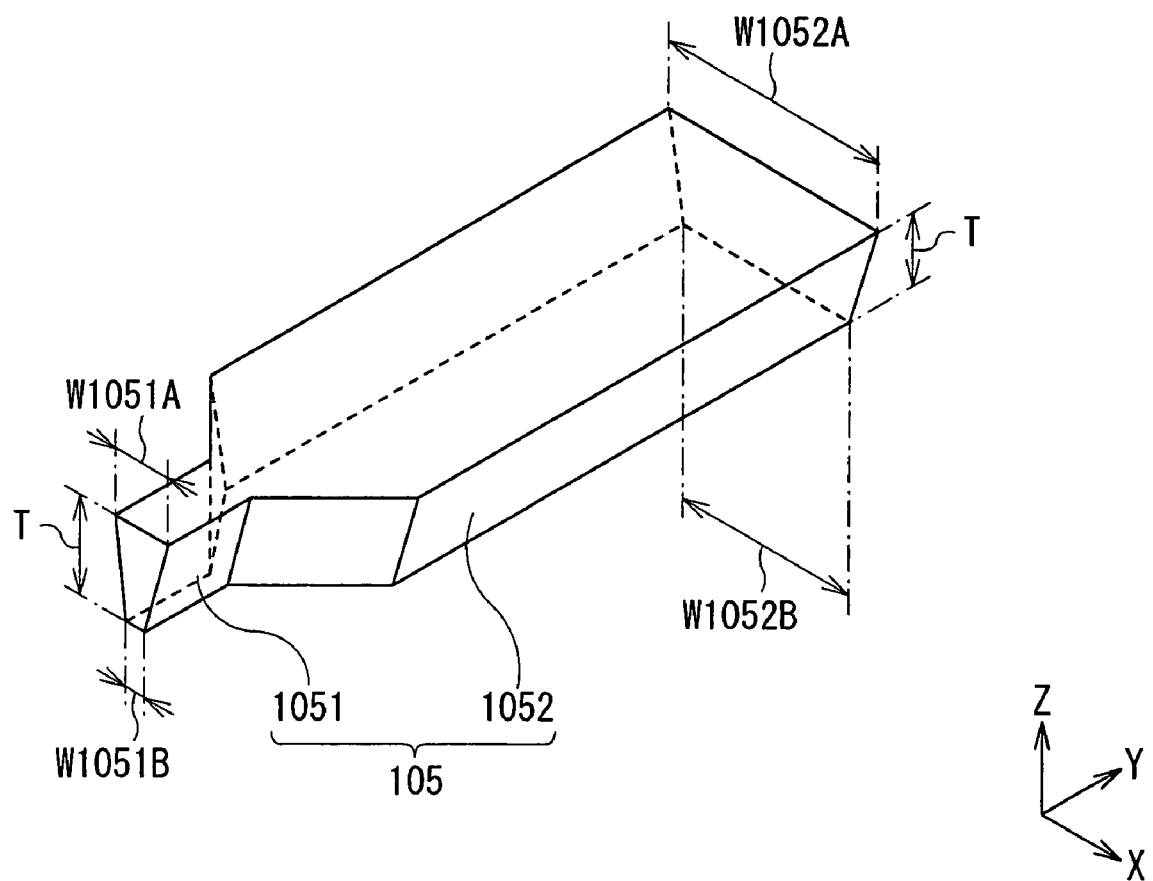
FIG. 7 is a perspective view showing a configuration of the plating film which is formed using the method of forming the plating film shown in FIGS. 1A and 1B to FIGS. 6A and 6B.

Finally, organic solvents such as N-Methyl-2-pyrrolidone (NMP) and acetone are used in order to dissolve and remove the photoresist pattern 103 so that the seed film 104 and the plating film 105 remain on the substrate 101 as shown in FIGS. 6A and 6B. This completes forming the plating film 105.

As shown in FIGS. 5A to 7, the plating film 105 includes the high aspect ratio (thickness/width) portion 1051 formed in the opening 103K1 and the low aspect ratio portion 1052 formed in the opening 103K2. The high aspect ratio portion 1051 has a cross sectional configuration of a trapezoid with the upper end width W1051A larger than the lower end width W1051B (a side inclination angle θ). The low aspect ratio portion 1052 has a cross sectional configuration of a trapezoid with the upper end width W1052A larger than the lower end width W1052B. In this case, the aspect ratio in the high aspect ratio portion 1051 is represented as: the thickness T/the maximum width W1051A. The aspect ratio in the low aspect ratio portion 1052 is represented as: the thickness T/the maximum width W1052A.

In the method of forming the plating film according to the embodiment of the present invention, the photoresist pattern 103 having the opening 103K1 with the high aspect ratio (depth/width) and the opening 103K2 with the low aspect ratio is formed on the substrate 101. The seed film 104 is formed so as to cover at least the exposed surface 101M of the substrate 101 in the openings 103K1 and 103K2 and the inner wall 103M of the photoresist pattern 103. The plating film 105 of magnetic materials is deposited on the seed film 104 in the openings 103K1 and 103K2 such that while applying the magnetic field FV, at least the opening 103K1 is filled and then while applying the magnetic field FP, at least the opening 103K2 is filled. Therefore, the magnetic properties of the plating film 105 are improved for the following reasons.

Figure 8A:
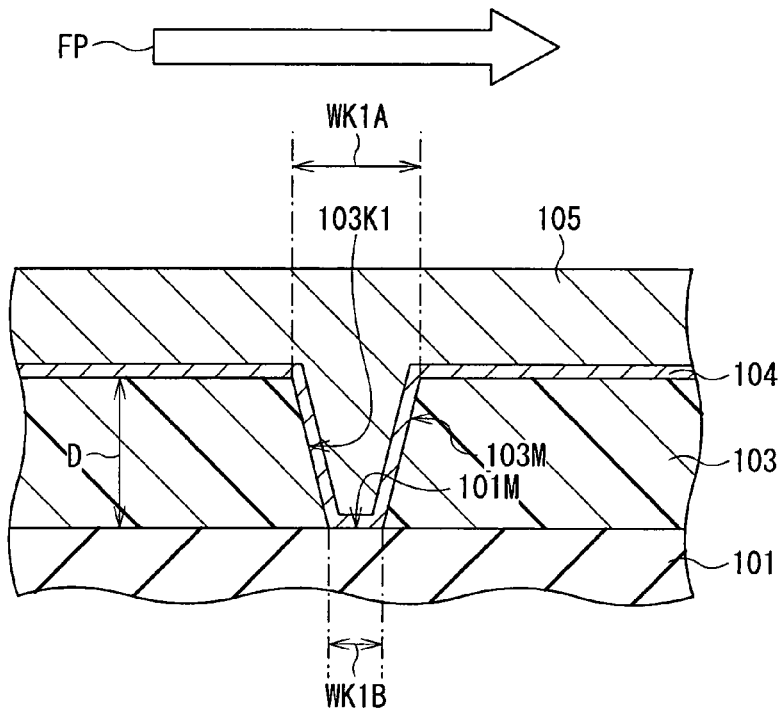
FIGS. 8A and 8B are cross sectional views illustrating a comparative example with respect to the method of forming the plating film according to an embodiment of the present invention.
Figure 8B:
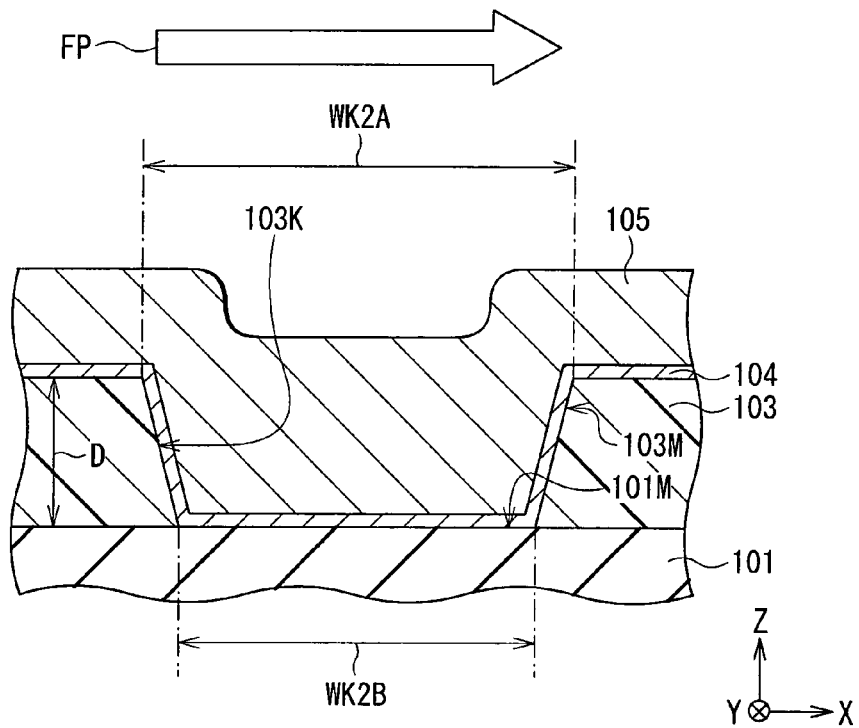
Figure 9A:
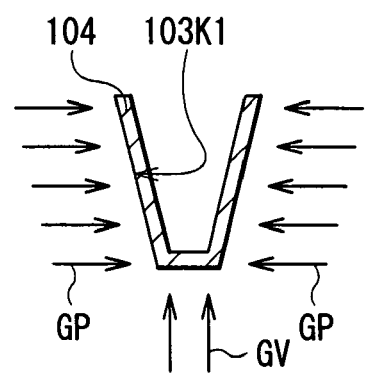
FIGS. 9A and 9B are views illustrating distribution of the deposit direction of the plating film.
Figure 9B:
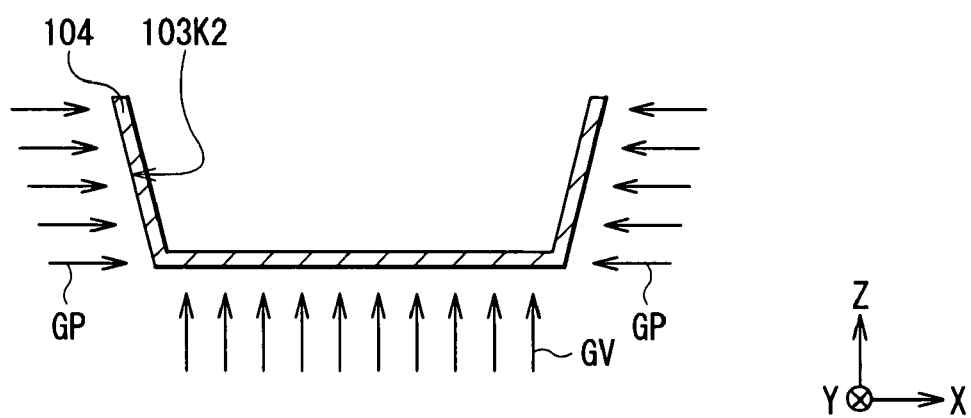
Figure 10A:
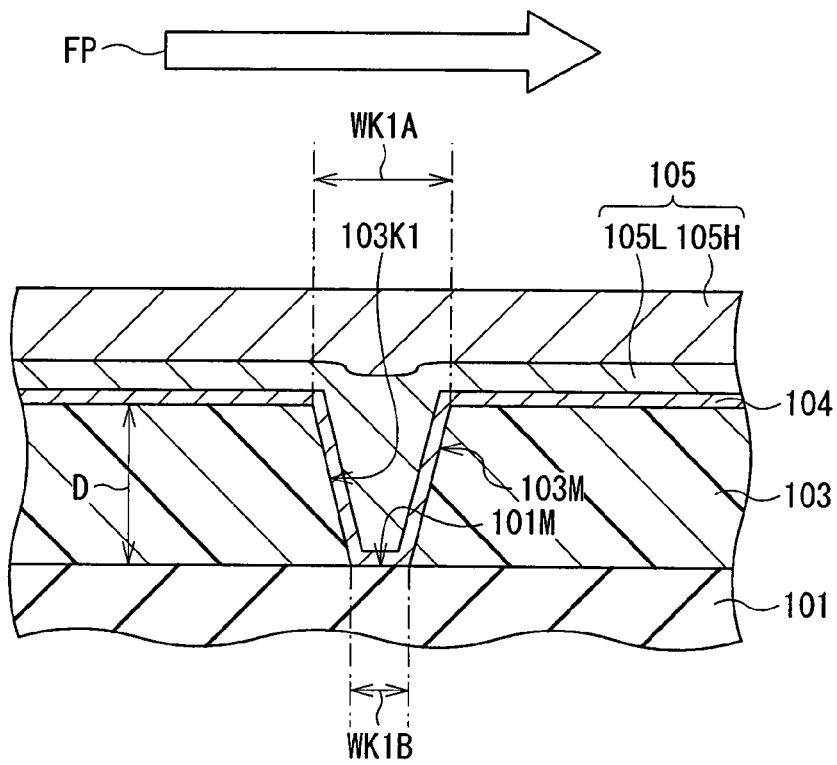
FIGS. 10A and 10B are cross sectional views illustrating a modification with respect to the method of forming the plating film according to an embodiment of the present invention.
Figure 10B:
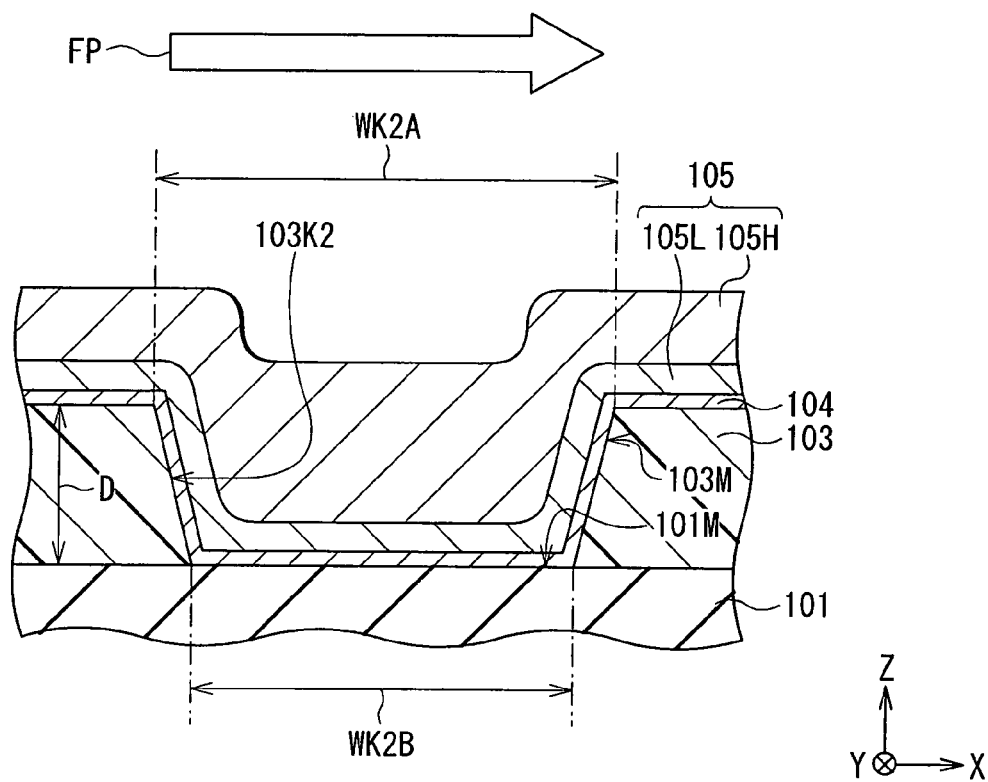
Figure 11A:
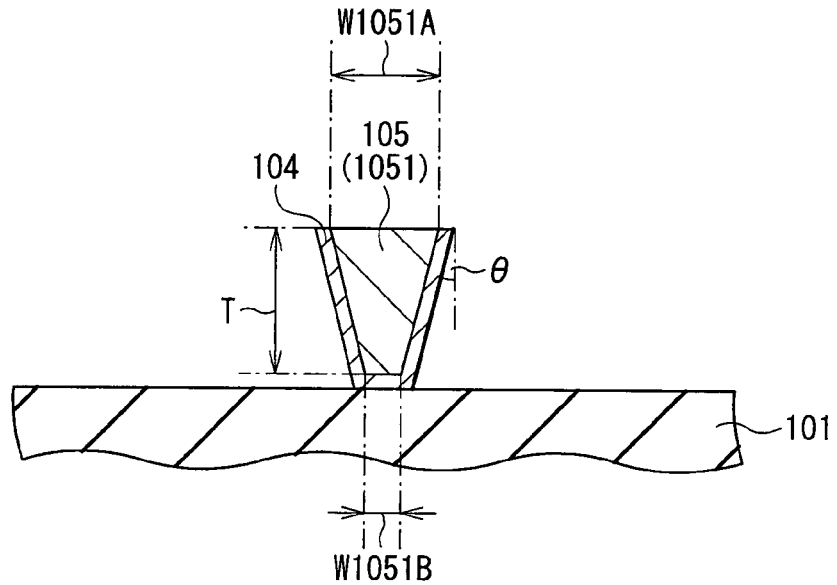
FIGS. 11A and 11B are cross sectional views illustrating a step following FIGS. 10A and 10B.
Figure 11B:
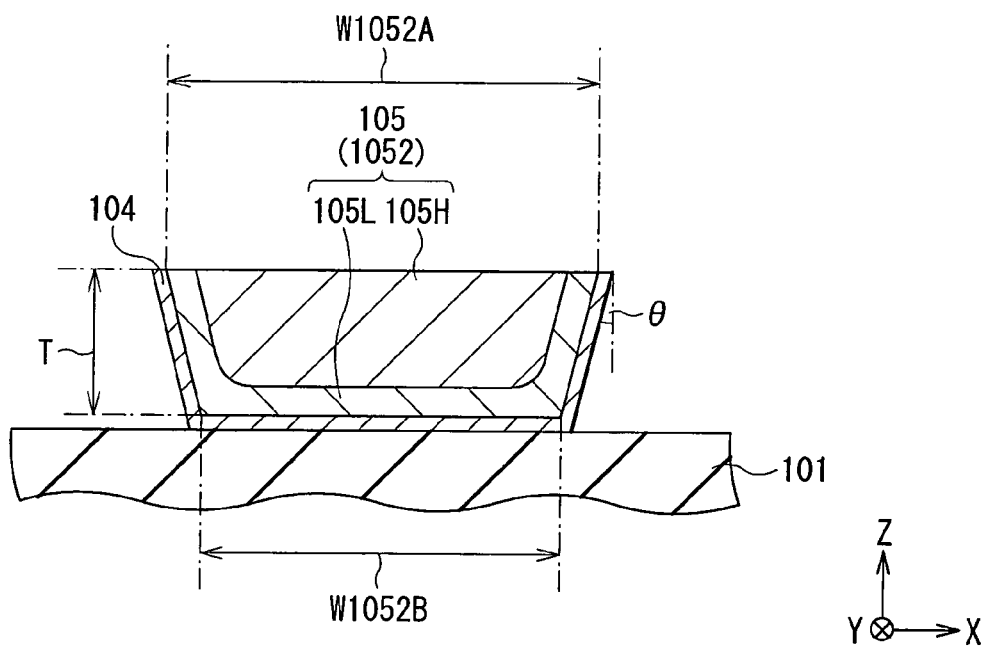

FIGS. 8A and 8B illustrate a comparative example to the method of forming the plating film according to the embodiment of the present invention, showing the cross sectional configuration in correspondence with FIGS. 3A to 4B. FIGS. 9A and 9B illustrate distribution of the deposit direction of the plating film, extracting only the main part of the seed film 104 (the portion substantially contributing to deposit of the plating film 105).

In the comparative example shown in FIGS. 8A and 8B, the application direction is not changed from the direction of the magnetic field FV to the direction of the magnetic field FP during depositing of the plating film 105. While applying only the magnetic field FP, the entire plating film 105 is deposited. The comparative example takes the same forming steps as the present embodiment except the point described above.

In FIGS. 9A and 9B, because the aspect ratios are different between the openings 103K1 and 103K2, there occurs a difference in distribution of the deposit direction of the plating film. That is, as shown in FIG. 9A, when the plating film is deposited on the seed film 104, the deposit component GP in the width direction is more dominant than the deposit component GV in the depth direction, in the opening 103K1 with the high aspect ratio (the depth is larger than the width). Thus the opening 103K1 is substantially filled with the deposit component GP in the width direction. On the other hand, as shown in FIG. 9B, the deposit component GV in the depth direction is more dominant than the deposit component GP in the width direction, in the opening 103K2 with the low aspect ratio (the width is larger than the depth). Thus the opening 103K2 is substantially filled with the deposit component GV in the depth direction.

In the comparative example as shown in FIGS. 7 to 9B, the plating film 105 is deposited in the openings 103K1 and 103K2. While applying only the magnetic field FP, the openings 103K1 and 103K2 are filled. Thus in the opening 103K2, the application direction of the magnetic field FP intersects the direction of the substantial deposit component GV; however, in the opening 103K1, the application direction of the magnetic field FP does not intersect the direction of the substantial deposit component GP. As a result, the plating film 105 formed in the opening 103K2 (the low aspect ratio portion 1052) can have superior magnetic properties; however, the plating film 105 formed in the opening 103K1 (the high aspect ratio portion 1051) does not have the superior magnetic properties.

On the other hand, in the present embodiment as shown in FIGS. 3A, 3B, 4A, 4B, 7, 9A and 9B, the plating film 105 is deposited in the openings 103K1 and 103K2. While applying the magnetic field FV, the opening 103K1 is filled. Then while applying the magnetic field FP, the opening 103K2 is filled. Thus in the opening 103K2, the application direction of the magnetic field FP intersects the direction of the substantial deposit component GV. Also, in the opening 103K1, the application direction of the magnetic field FV intersects the direction of the substantial deposit component GP. As a result, both of the plating film 105 formed in the opening 103K2 (the low aspect ratio portion 1052) and the plating film 105 formed in the opening 103K1 (the high aspect ratio portion 1051) can have superior magnetic properties. Accordingly, the magnetic properties of the plating film 105 in the present embodiment can be more improved in comparison with the comparative example.

In the present embodiment as shown in FIGS. 3A, 3B, 4A, 4B, 6A and 6B, the same magnetic materials as materials of the plating film 105 are used before and after changing the application direction of the magnetic field. Thus the plating film 105 is configured such that both of the high aspect ratio portion 1051 and the low aspect ratio portion 1052 are formed with a single layer structure. However, it is not necessarily limited to this. For example, as shown in FIGS. 10A to 11B in correspondence with FIGS. 3A, 3B, 4A, 4B, 6A and 6B, different magnetic materials may be used before and after changing the application direction of the magnetic field. In this case, the plating film 105 may be formed to have the low aspect ratio portion 1052 with a double layer structure. Specifically, while applying the magnetic field FV, the lower layer 105L of arbitrary magnetic materials is formed, and then while applying the magnetic field FP, the upper layer 105H of magnetic materials different from that of the lower layer 105L is formed on the lower layer 105L. The high aspect ratio portion 1051 is composed of only the lower layer 105L. The low aspect ratio portion 1052 is composed of the lower layer 105L and the upper layer 105H. In this case, the magnetic properties such as saturation flux density are varied for the lower layer 105L and upper layer 105H, thereby enabling arbitrary control of the magnetic properties of the plating film 105.

In the present embodiment as shown in FIGS. 1A to 2B, the photoresist pattern 103 as a pattern film is used to form the plating film 105. After completion of forming the plating film 105, the photoresist pattern 103 is removed. However, it is not necessarily limited to this. For example, as shown in FIGS. 12A to 15B in correspondence with FIGS. 1A to 2B, a nonmagnetic film pattern 110 may be used instead of the photoresist pattern 103 as a pattern film to form the plating film 105. In this case, the nonmagnetic film pattern 110 may remain after completion of forming the plating film 105.

Figure 12A:
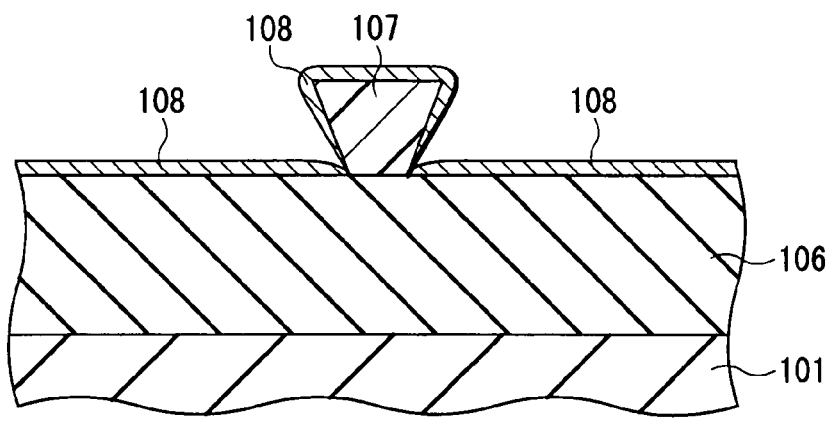
FIGS. 12A and 12B are cross sectional views illustrating another modification with respect to the method of forming the plating film according to an embodiment of the present invention.
Figure 12B:
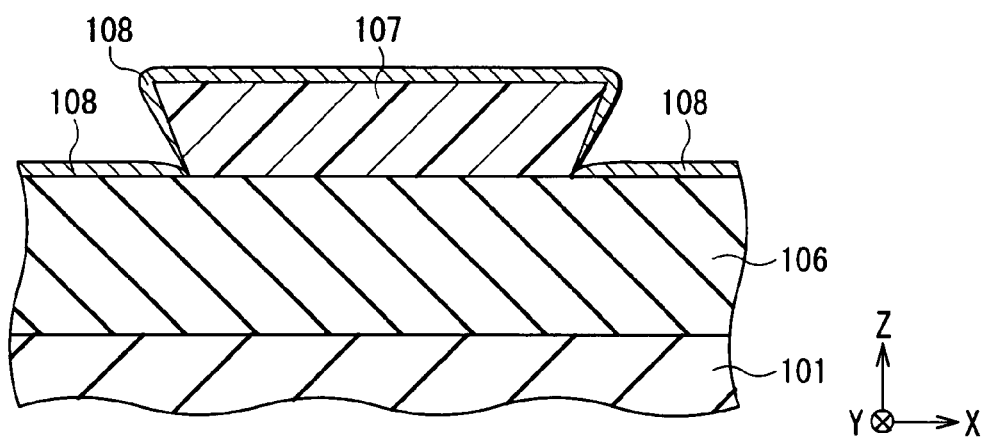

Specifically, as shown in FIGS. 12A and 12B, for example sputtering method or chemical vapor deposition (CVD) is used to form the nonmagnetic film 106 on a surface of a substrate 101. Materials of the nonmagnetic film 106 are not limited as long as they are nonmagnetic materials except photoresist, and materials such as aluminum oxide ($Al_2O_3$) and silicon oxide ($SiO_2$) are used. Next, a lift-off mask 107 is formed on the nonmagnetic film 106. When forming the lift-off mask 107, photoresist is applied on the surface of the nonmagnetic film 106 to form a photoresist film (not shown). Then patterning is performed on the photoresist film using photolithography method. Next, an etching mask 108 is formed so as to cover the lift-off mask 107 and the nonmagnetic film 106 of the periphery of the lift-off mask 107 using, for example, sputtering method. Forming materials of the etching film 108 are materials with slower etching rate than the nonmagnetic film 106, such as tantalum (Ta), titanium nitride (TiN) and nickel iron alloy (NiFe).

Figure 13A:
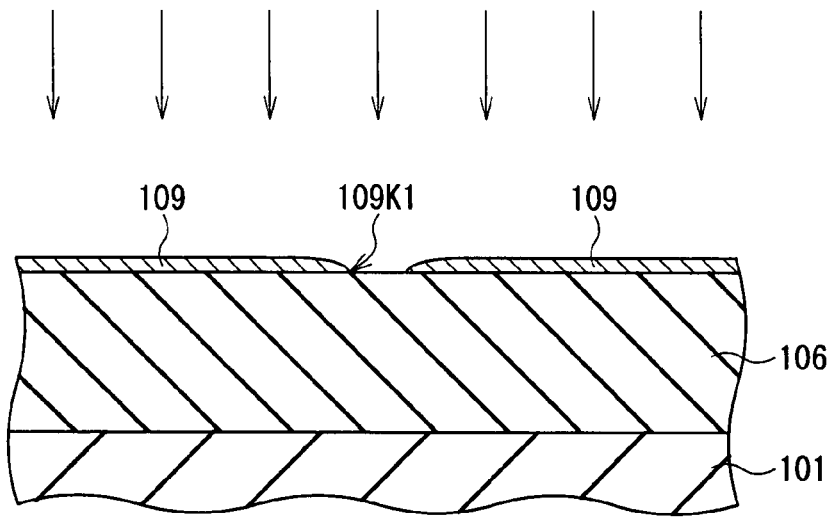
FIGS. 13A and 13B are cross sectional views illustrating a step following FIGS. 12A and 12B.
Figure 13B:
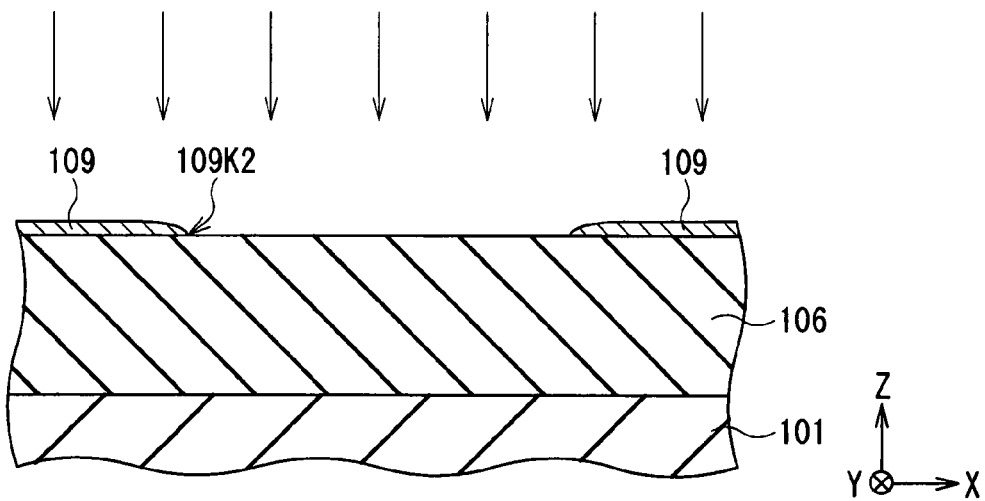
Figure 14A:
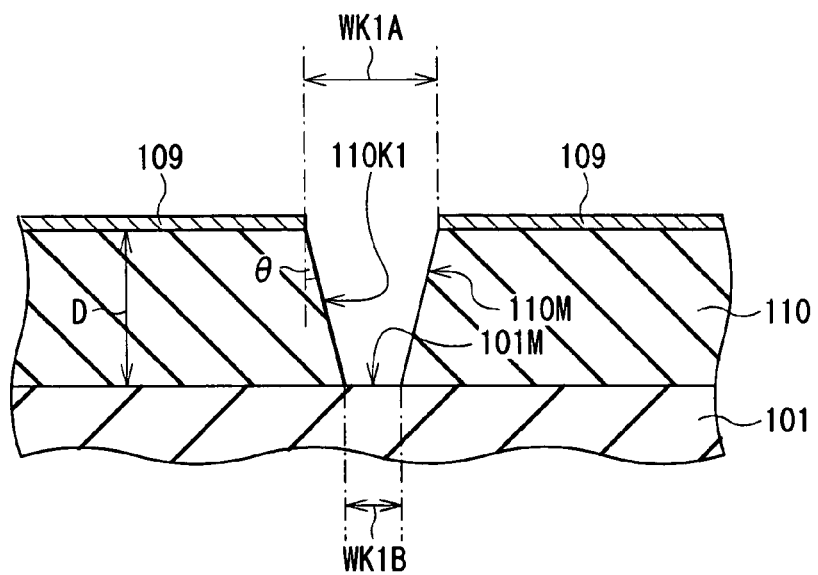
FIGS. 14A and 14B are cross sectional views illustrating a step following FIGS. 13A and 13B.
Figure 14B:
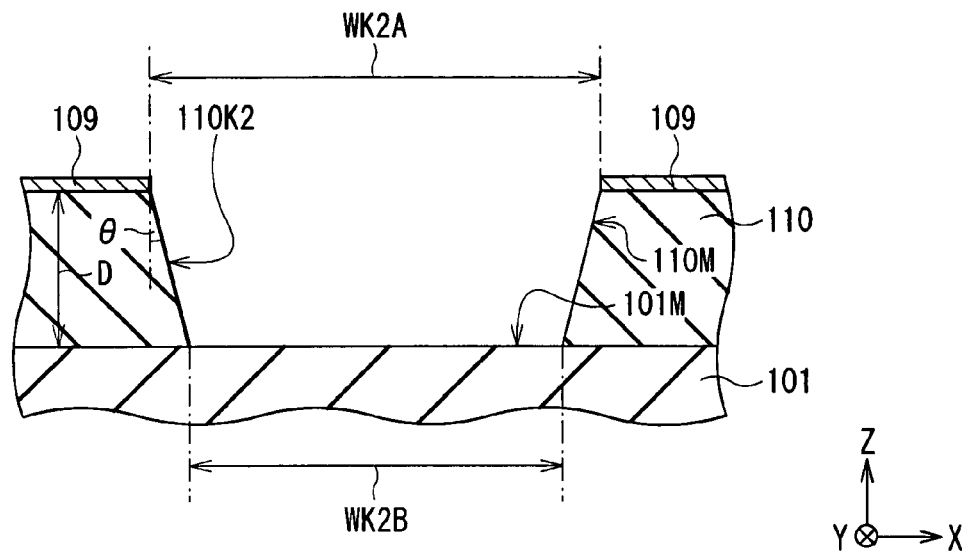
Figure 15A:
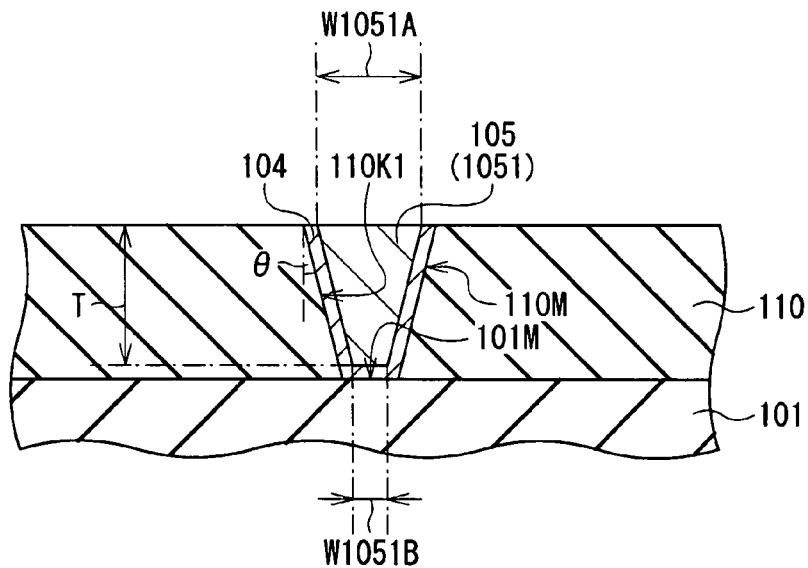
FIGS. 15A and 15B are cross sectional views illustrating a step following FIGS. 14A and 14B.
Figure 15B:
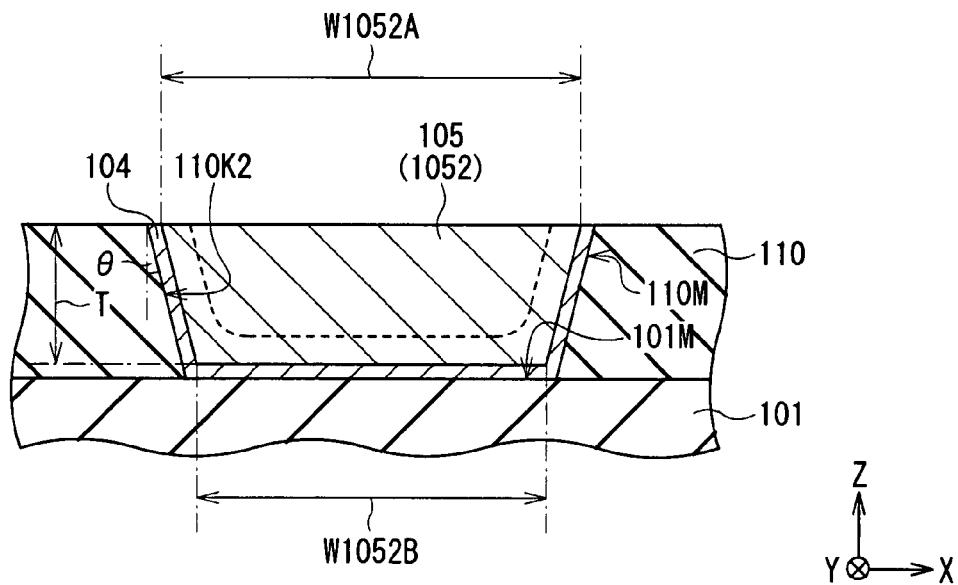

Next, the lift-off mask 107 is lifted off using organic solvents such as NMP and acetone, and the etching film 108 is partially removed. As shown in FIGS. 13A and 13B, an etching mask 109 having openings 109K1 and 109K2 is formed on the nonmagnetic film 106. Next, etching is performed on the nonmagnetic film 106 through the openings 109K1 and 109K2 of the etching mask 109 using dry etching such as ion milling and reactive ion etching (RIE) or wet etching, to form the nonmagnetic film pattern 110 having openings 110K1 and 110K2 on the substrate 101 as shown in FIGS. 14A and 14B. The openings 110K1 and 110K2 and the inner wall 110M in FIGS. 14A and 14B correspond to the openings 103K1 and 103K2 and the inner wall 103M in FIGS. 2A and 2B, respectively. In case of using RIE to form the nonmagnetic film pattern 110, mixed gas of such as argon (Ar), chlorine ($Cl_2$) and boron trichloride ($BCl_3$) is used as etching gas. Then, with reference to FIGS. 2A to 5B, the same steps as the described steps (a series of steps from forming the seed film 104 to planarizing the plating film 105) are taken. Accordingly, the high aspect ratio portion 1051 is formed in the opening 110K1 of the nonmagnetic film pattern 110, and the low aspect ratio portion 1052 is formed in the opening 110K2. This completes forming the plating film 105.

Different from the case that the photoresist pattern 103 is used as a pattern film, in this case, nonmagnetic materials with high physical stability are not necessarily buried in the periphery again when the plating film 105 after completion is desired to be magnetically separated from the periphery. Instead, the nonmagnetic film pattern 110 as forming the plating film 105 can be used. Thus the steps of forming the plating film 105 can be simplified.

Figure 16A:
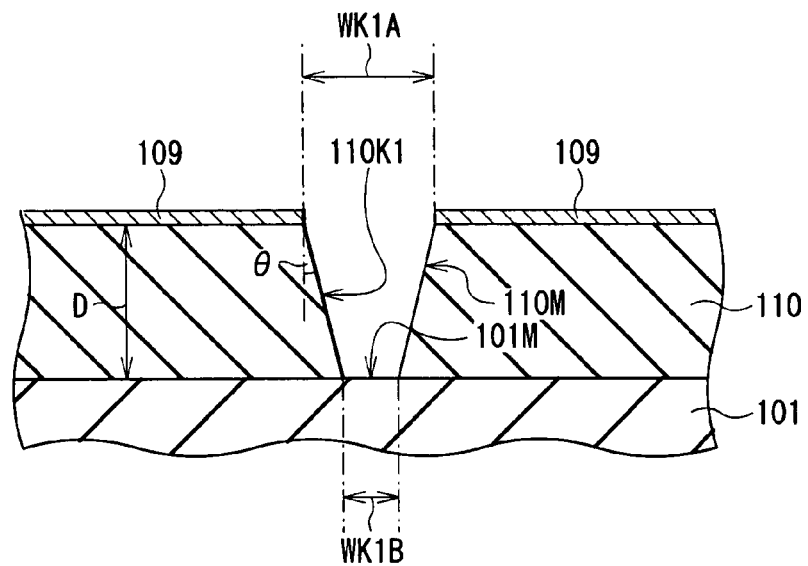
FIGS. 16A and 16B are another cross sectional views illustrating another step following FIGS. 13A and 13B.
Figure 16B:
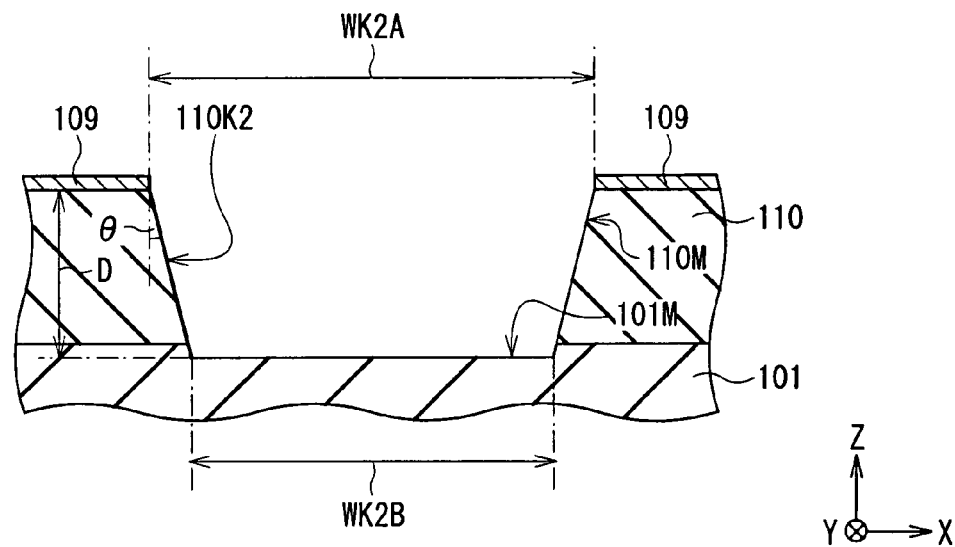

For more detail, in FIGS. 13A and 13B, when etching is performed on the nonmagnetic film 106 using RIE, the depth D of the opening 110K2 may become larger than the depth D of the opening 110K1 as shown in FIGS. 16A and 16B in correspondence with FIGS. 14A and 14B. In RIE, the etching rate increases with an increase of an opening area. That is, the etching rate of the opening 110K2 tends to become larger than the opening 110K1. Also in this case, the same effects can be obtained as long as the aspect ratio relationship as described is established in the openings 110K1 and 110K2.

Figure 17A:
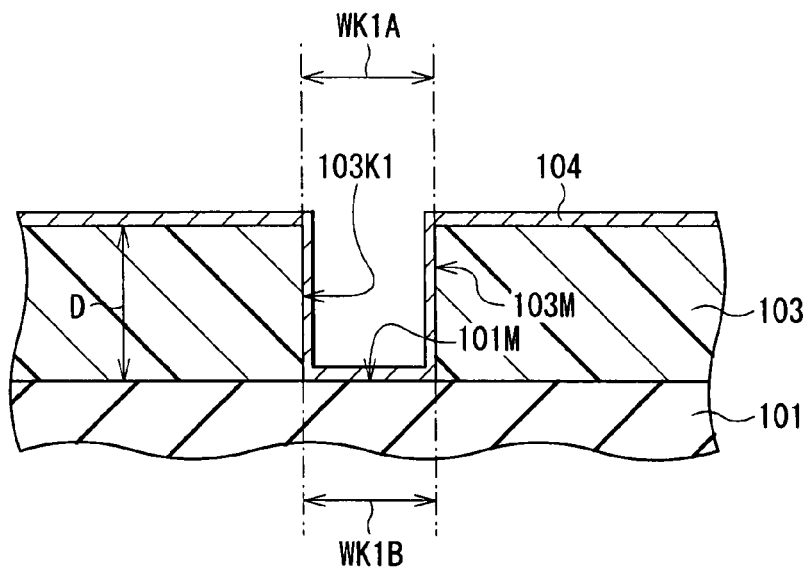
FIGS. 17A and 17B are cross sectional views illustrating still another modification with respect to the method of forming the plating film according to an embodiment of the present invention.
Figure 17B:
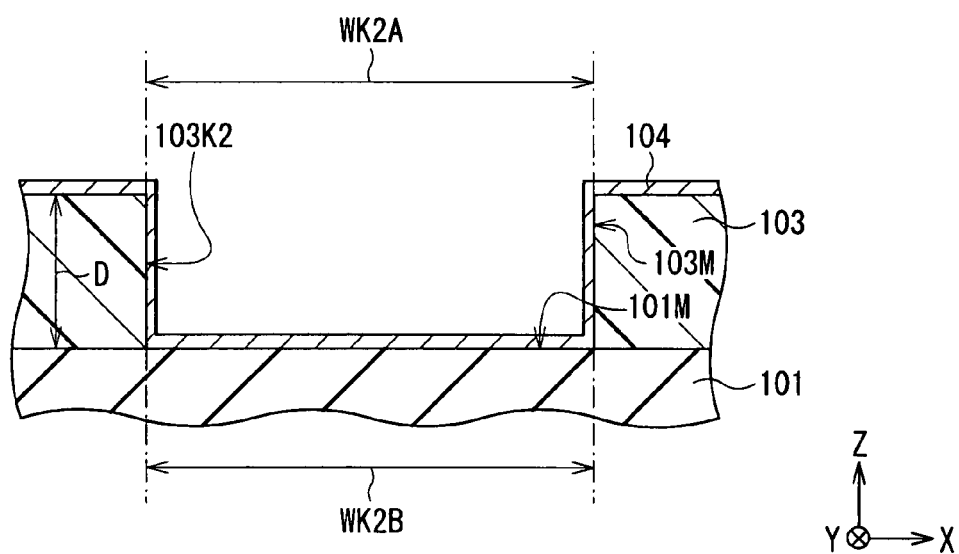
Figure 18:
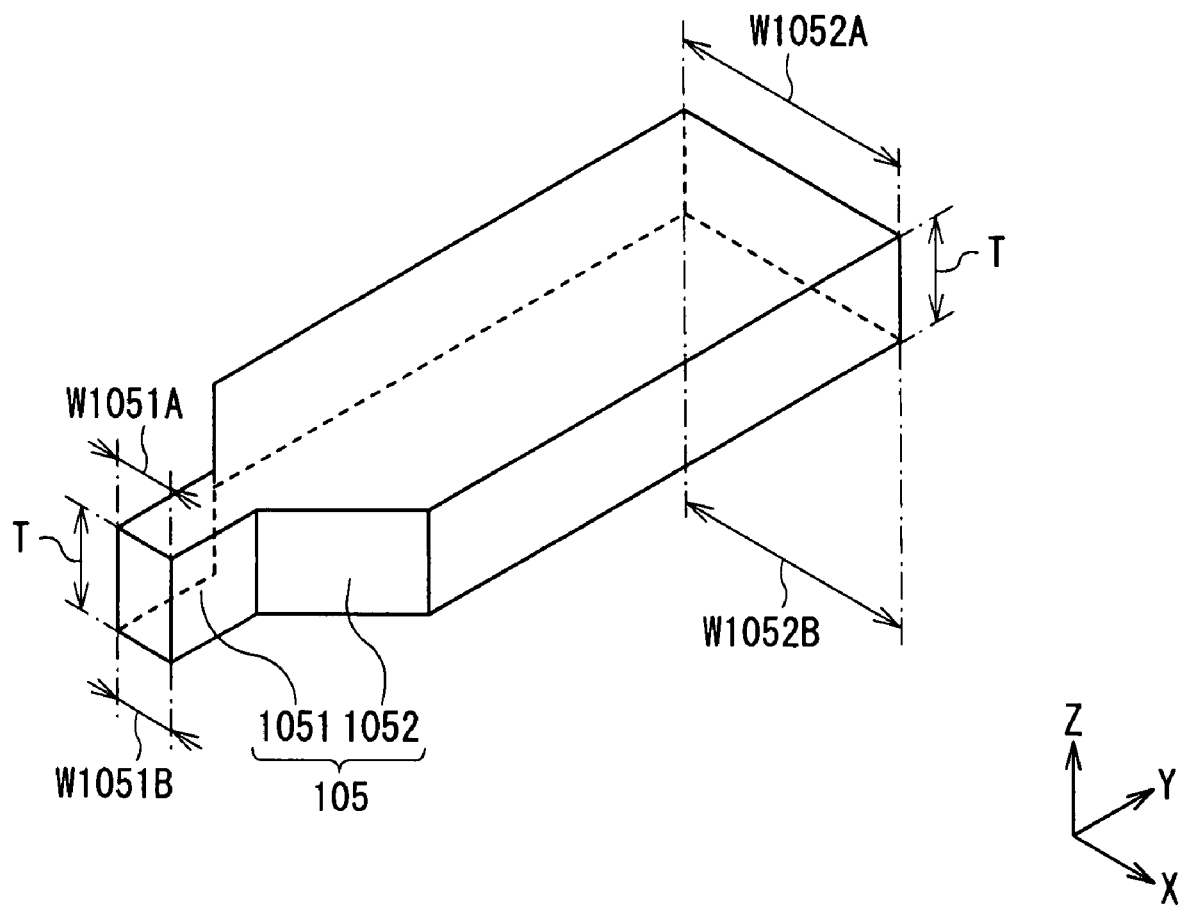
FIG. 18 is a perspective view showing a configuration of the plating film which is formed using the method of forming the plating film shown in FIGS. 17A and 17B.

In the embodiment as shown in FIGS. 2A to 7, the inner wall 103M of the photoresist pattern 103 is inclined such that the widths of the openings 103K1 and 103K2 increase as the openings 103K1 and 103K2 separate from the substrate 101. Thus the plating film 105 is formed such that the upper end widths W1051A and W1052A are larger than the lower end widths W1051B and W1052B in the high aspect ratio portion 1051 and low aspect ratio portion 1052. However, it is not necessarily limited to this. Specifically, in FIGS. 17A to 18 in correspondence with FIGS. 2A, 2B, and 7, the upper end width WK1A and the lower end width WK1B of the opening 103K1 are uniform widths and the upper end width WK2A and the lower end width WK2B of the opening 103K2 are uniform widths. Therefore, the plating film 105 may be formed with the uniform widths of the upper end width W1051A and the lower end widths W1051B in the high aspect ratio portion 1051 and the uniform widths of the upper end width W1052A and the lower end width W1052B in the low aspect ratio portion 1052. Also in this case, the same effects as the embodiment can be obtained.

The method of forming the plating film according to the embodiment of the present invention is applicable to the method of manufacturing a magnetic device having a magnetic film with the high aspect ratio portion and the low aspect ratio portion. That is, a magnetic film can be formed using the method of forming the plating film. Below, a case will be explained where the method of forming the plating film is applied to the method of manufacturing the thin film magnetic head as representing magnetic devices.

Figure 19:
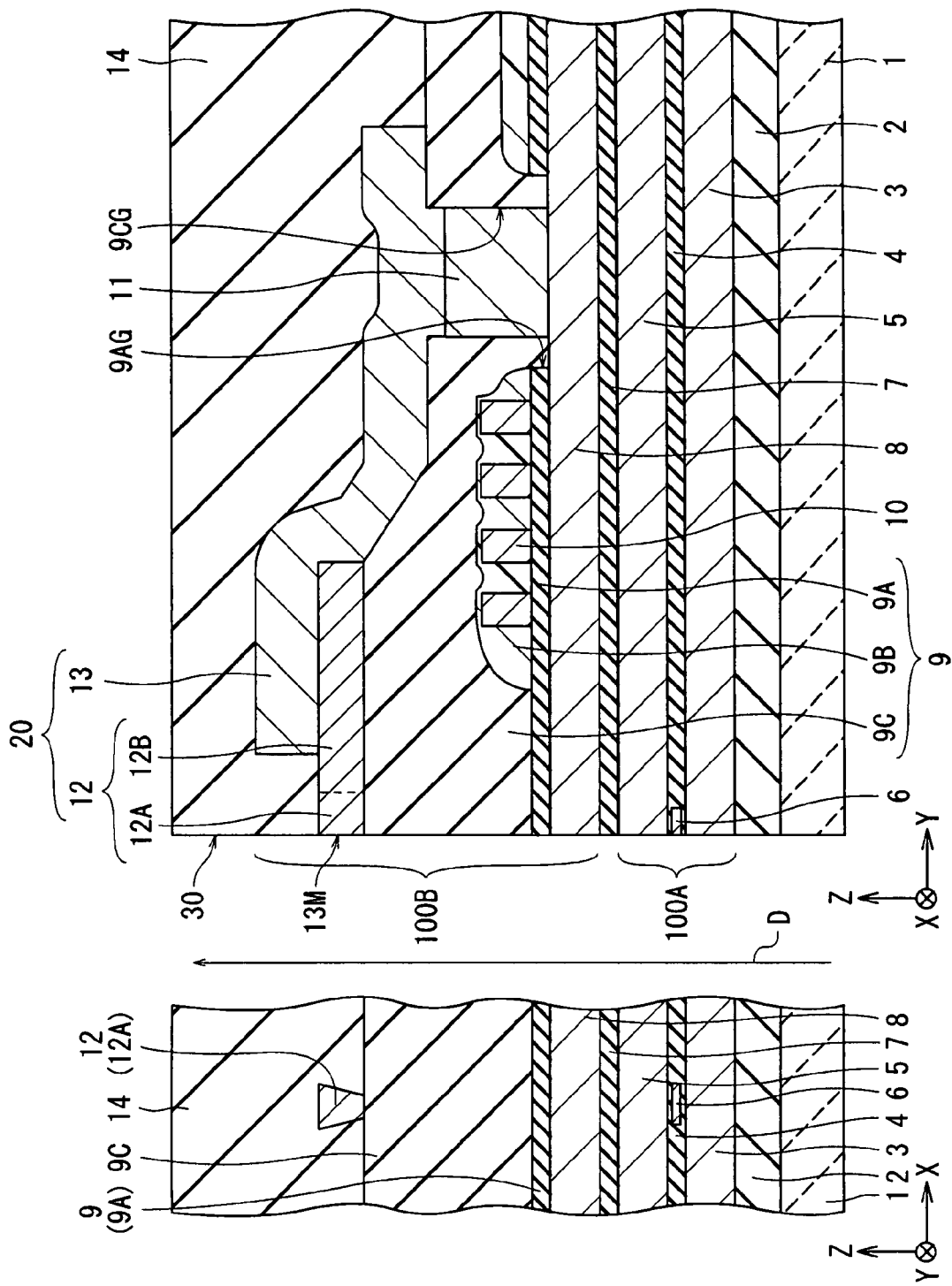
FIGS. 19A and 19B are cross sectional views showing a configuration of thin film magnetic head which is manufactured using the method of manufacturing the thin film magnetic head as applying the method of forming the plating film according to an embodiment of the present invention.
Figure 20:
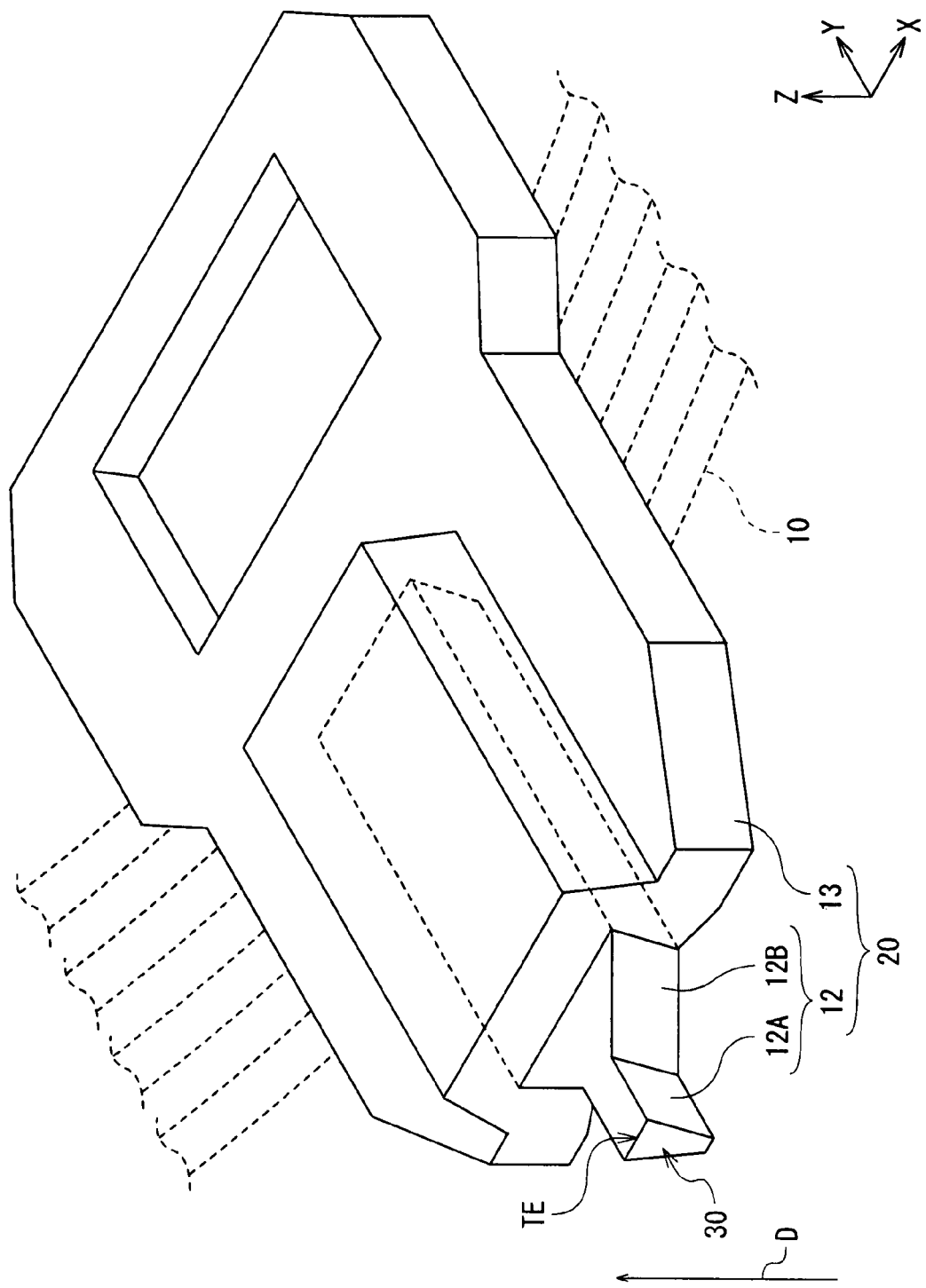
FIG. 20 is an enlarged perspective view showing a configuration of principal parts of the thin film magnetic head shown in FIG. 19A and 19B.

FIGS. 19A to 20 show a configuration of the thin film magnetic head manufactured using the method of manufacturing the magnetic device. FIGS. 19A and 19B show the cross sectional configuration and FIG. 20 shows the enlarged perspective configuration of main parts. FIG. 19A shows the cross section parallel to the air bearing surface, and FIG. 19B shows the cross section orthogonal to the air bearing surface.

The thin film magnetic head is equipped on a magnetic recording device such as a hard disk drive so that a magnetic recording medium (not shown) such as a hard disk moving to the medium traveling direction D is subjected to magnetic operation. Specifically, the thin film magnetic head is, for example, a composite head capable of both recording and reproducing. As shown in FIGS. 19A and 19B, the thin film magnetic head has a configuration including the following stacked in order: a substrate 1 composed of ceramic materials such as Altic; an insulating layer 2 composed of nonmagnetic insulating materials such as alumina on the substrate 1; a reproducing head portion 100A; a separating layer 7 composed of nonmagnetic insulating materials such as alumina; a recording head portion 100B; and an overcoat layer 14 composed of nonmagnetic insulating materials such as alumina.

The reproducing head portion 100A performs reproduction using Magnetoresistive (MR) effect, and has such a configuration including the following stacked in order: a lower lead shield layer 3; a shield gap film 4; and an upper lead shield layer 5. An MR element 6 as a reproducing element is buried in the shield gap film 4 so that one end surface of the MR element 6 is exposed at the air bearing surface 30 opposing the magnetic recording medium.

Both of the lower lead shield layer 3 and the upper lead shield layer 5 magnetically separate the MR element 6 from the periphery, and extend backward from the air bearing surface 30. Each of the lower lead shield layer 3 and upper lead shield layer 5 is composed of magnetic materials such as nickel iron alloy (for example, Ni: 80 weight percent and Fe: 20 weight percent).

The shield gap film 4 electrically separates the MR element 6 from the periphery, and is composed of nonmagnetic insulating materials such as alumina.

The MR element 6 performs reproduction using, for example, Giant Magnetoresistive (GMR) effect or Tunnel Magnetoresistive (TMR) effect.

The recording head portion 100B is the perpendicular magnetic recording head performing recording using perpendicular magnetic recording, and has such a configuration including the following stacked in order: an auxiliary magnetic pole layer 8; a gap layer 9 burying the thin film coil 10 and a connecting portion 11; and a main magnetic pole layer 20. FIG. 20 shows a configuration of the main magnetic pole layer 20 and the periphery.

Via the magnetic recording medium, the auxiliary magnetic pole layer 8 refluxes magnetic flux released from the main magnetic pole layer 20, and extends backward from the air bearing surface 30. The auxiliary magnetic pole layer 8 is composed of magnetic materials such as nickel iron alloy (for example, Ni: 80 weight percent and Fe: 20 weight percent).

The gap layer 9 includes gap layer portions 9A, 9B and 9C. The gap layer portion 9A having a back gap 9AG is provided on the auxiliary magnetic pole layer 8, and is composed of nonmagnetic insulating materials such as aluminum oxide and silicon oxide. The gap layer portion 9B is provided on the gap layer portion 9A so as to cover between each turn of the tin film coil 10 and the periphery, and is composed of nonmagnetic insulating materials such as photoresist (photosensitive resin) and spin-on glass (SOG) showing fluidity by being heated, for example. The gap layer portion 9C having the back gap 9CG is provided on the gap layer potions 9A and 9B, and is composed of nonmagnetic insulating materials such as aluminum oxide and silicon oxide.

The thin film coil 10 generates magnetic flux for recording, and has a winding structure as winding spirally around the connecting portion 11 as a center. The thin film coil 10 is composed of a conductive material such as copper (Cu). In FIGS. 19A, 19B and 20, only a part of a plurality of windings composing the thin film coil 10 is illustrated.

The connecting portion 11 magnetically connects the auxiliary magnetic pole layer 8 and the main magnetic pole layer 20, and is composed of a magnetic material such as nickel iron alloy (for example, Ni: 80 weight percent, Fe: 20 weight percent).

The main magnetic pole layer 20 perpendicularly magnetizes the magnetic recording medium by leading the magnetic flux generated in the thin film coil 10 to the magnetic recording medium. The main magnetic pole layer 20 extends backward from the air bearing surface 30 so that the main magnetic pole layer 20 is magnetically connected to the auxiliary magnetic pole layer 8 via the connecting portion 11 in the back gaps 9AG and 9CG. In particular, the main magnetic pole layer 20 is composed of a magnetic pole portion layer 12 disposed on the front part of the gap layer portion 9C, and a magnetic pole body layer 13 magnetically connected to the magnetic pole portion layer 12 by covering the rear part of the magnetic pole portion layer 12 from the periphery.

The magnetic pole portion layer 12 operates as a part for releasing the magnetic flux, and is composed of magnetic material whose saturation magnetic flux density is larger than the magnetic pole body layer 13. The material of the magnetic pole portion layer 12 is, for example, material including iron and nitrogen, material including iron, zirconia and oxygen, material including iron and nickel, and the like. Preferably, it is at least one selected from the group consisting of nickel iron alloy (for example, Ni:45% and Fe:55%), iron nitride (FeN), iron cobalt alloy (FeCo), alloy including iron (FeM), and alloy including iron and cobalt (FeCoM). "M" in the above structural formulas (FeM and FeCoM) is, for example, at least one selected from the group consisting of nickel, nitrogen, carbon (C), boron (B), silicon, aluminum, titanium (Ti), zirconia, hafnium (Hf), molybdenum (Mo), tantalum, niobium (Nb) and copper.

The magnetic pole portion layer 12 extends backward from the air bearing surface 30, and corresponds to the plating film 105 (refer to FIG. 7) formed using the above method of forming the plating film. That is, the magnetic pole portion layer 12 includes the following in order from the side closer to the air bearing surface 30: the tip portion 12A as a magnetic pole portion corresponding to the high aspect ratio portion 1051; and the rear end portion 12B as a yoke portion corresponding to the low aspect ratio portion 1052. The tip portion 12A substantially operates as a part for releasing magnetic flux, and has a fine uniform width defining the recording track width of the magnetic recording medium. The width of the rear end portion 12B is, for example, larger than the tip portion 12A in rear and becomes gradually smaller in front toward the tip portion 12A.

The magnetic pole body layer 13 operates as storage of magnetic flux and extends backward from the position recessed from the air bearing surface 30. The magnetic pole body layer 13 is, for example, composed of the same magnetic material as material of the magnetic pole portion layer 12 and particularly composed of magnetic material with high corrosion resistance and higher resistance than the magnetic pole portion layer 12.

The thin film magnetic head generally uses existing thin film process including film forming technique such as plating method or sputtering method, patterning technique such as photolithography method, etching technique such as dry etching or wet etching, and planarization technique such as CMP so as to form each structural component stacked in order. That is, as shown in FIGS. 19A to 20, the reproducing head portion 100A is formed by forming the following in order: the insulating layer 2 on the substrate 1; on the insulating layer 2, the lower lead shield layer 3; the shield gap film 4 with the MR element 6 buried therein; and the upper lead shield layer 5. Next, the recording head portion 100B is formed by forming the following in order: the separating layer 7 on the reproducing head portion 100A; on the separating layer 7, the auxiliary magnetic pole layer 8; the gap layer 9 (the gap layer portions 9A, 9B and 9C) with the thin film coil 10 buried therein and the connecting portion 11; and the main magnetic pole layer 20 (the magnetic pole portion layer 12 and the yoke portion layer 13). In this case, the magnetic pole portion layer 12 is formed as the plating film 105 using the above method of forming the plating film. In particular, when the plating film is deposited so as to fill the opening with the low aspect ratio, the magnetic field FP is preferably applied in the recording track width direction (X-axis direction), that is, the direction intersecting the extending direction of the main magnetic pole layer 20 (the direction of magnetic flux released from the main magnetic pole layer 20). Finally, after forming the overcoat layer 14 on the recording head portion 100B, the air bearing surface 30 is formed using machining, polishing and the like. This completes forming the thin film magnetic head.

In the method of manufacturing the thin film magnetic head, the magnetic pole portion layer 12 having the tip portion 12A with the high aspect ratio and the rear end portion 12B with the low aspect ratio is formed using the above method of forming the plating film so that the magnetic properties of the magnetic pole portion layer 12 are improved. Accordingly, the magnetic properties in operation are stabilized. In this case, application of the magnetic field FP in the recording track width direction can improve the magnetic properties from a viewpoint of suppressing occurrence of pole erasure described later.

In particular, when the magnetic pole portion layer 12 is formed using the above method of forming the plating film, advantages can be obtained from the following viewpoint.

In the magnetic pole portion layer 12 performing recording using perpendicular magnetic recording, the recording is substantially performed in the trailing edge TE, that is, the end of the medium traveling direction D in the exposed surface of the air bearing surface 30 of the tip portion 12A. Accordingly, preferred magnetic properties in the magnetic pole portion layer 12 are desirable in the vicinity of the trailing edge TE of the tip portion 12A which substantially relates to recording.

Here, with reference to FIGS. 3A, 3B, 4A, 4B, 7, 9A, 9B and 20, the following is concerned for improvement of magnetic properties of the magnetic pole portion layer 12. That is, the tip portion 12A includes only the plating film 105 deposited under application of the magnetic field FV. On the other hand, the rear end portion 12B includes not only the plating film 105 deposited under application of the magnetic field FP, but also the plating film 105 deposited under application of the magnetic field FV.

To simply improve the magnetic properties, the rear end portion 12B is formed such that the plating film 105 deposited under application of the magnetic field FV is not included, but only the plating film 105 deposited under application of the magnetic field FP is preferably included. However, a volume of the rear end portion 12B (a volume of the opening 103K2) is remarkably larger than a volume of the tip portion 12A (a volume of the opening 103K1). Thus the plating film 105 deposited under application of the magnetic field FP occupies most of the parts in the rear end portion 12B. Also, recording is substantially performed in the trailing edge TE of the tip portion 12A, not the rear end portion 12B. Thus the ideal relationship that the deposit direction of the plating film 105 intersects the application direction of the magnetic field is necessary at least in the tip portion 12A. The substantial magnetic properties of the magnetic pole portion layer 12 can be fully improved as long as the above ideal relationship exists at least in the tip portion 12A. If enough volume difference between the tip portion 12A and the rear end portion 12B is kept, the above concern does not result in a serious problem.

With reference to FIGS. 3A, 3B, 7, 9A, 9B and 20, when the plating film 105 is deposited in the opening 103K1 to form the tip portion 12A, a ratio of the deposit component GV to the plating film 105 along the application direction of the magnetic field FV becomes smaller at the upper part of the opening 103K1 than the lower part. This is because, at the upper part of the opening 103K1 which is away from the exposed surface 101M of the substrate 101, the deposit component GP is more dominant than the deposit component GV. Because the deposit component GV along the application direction of the magnetic field FV does not satisfy the above ideal relationship, the deposit component GV is not preferably included to improve the magnetic properties of the magnetic pole portion layer 12. With respect to this point, when the tip portion 12A is formed, the above-described ratio of the deposit component GV along the application direction of the magnetic field FV becomes small in the vicinity of the trailing edge TE which is located away from the substrate 101. Thus this is desirable to improve the substantial magnetic properties of the magnetic pole portion layer 12. Accordingly, even in case that the deposit component GV along the application direction of the magnetic field FV is included in the tip portion 12A, the ratio of the deposit component GV becomes smaller in the vicinity of the trailing edge TE as long as the magnetic pole portion layer 12 is formed using the above method of forming the plating film. The method of forming the plating film works effectively in improvement of the magnetic properties of the magnetic pole portion 12.

In the above method of manufacturing the thin film magnetic head, a case is explained where the thin film magnetic head is a composite thin film magnetic head. However, it is not necessarily limited to this. For example, it is applicable to a record-only thin film magnetic head having an inductive magnetic transducer element for recording, and a thin film magnetic head having an inductive magnetic transducer element for both recording and reproducing. Also, the thin film magnetic head may have a structure with the elements for recording and reproducing stacked in reverse order.

Next, examples according to the present invention will be explained.

Example 1

In the example 1, using the method of manufacturing the magnetic device of the present invention, a thin film magnetic head was manufactured by forming the magnetic pole portion layer 12 as shown in FIGS. 19A, 19B and 20. When the magnetic pole portion layer 12 was formed, polyhydroxystyrene chemically amplified photoresist (PHS-CAR) was applied on the surface of the gap layer portion 9C of aluminum oxide, and it was subjected to baking to form the photoresist film 102 (300 nm in thickness). Next, patterning was performed on the photoresist film 102 using photolithography method so that the photoresist pattern 103 having the openings 103K1 and 103K2 was formed. In photolithography process, a stepper as an exposure source (exposed wavelength: 248 nm) was used. Next, using sputtering method, the seed film 104 (30 nm in thickness) of tantalum was formed so as to cover the exposed surface of the gap layer portion 9C in the openings 103K1 and 103K2 and the photoresist pattern 103. Next, using a pair of Helmholtz coils, the opening 103K1 was filled while applying the magnetic field FV of a formula: $1000\times10^3(4\pi)$A/m (=1000 Oe) in the direction intersecting the surface of the gap layer portion 9C. Then, using the other pair of Helmholtz coils, the opening 103K2 was filled while applying the magnetic field FP of a formula: $1000\times10^3(4\pi)$A/m in the direction along the surface of the gap layer portion 9C (the recording track width direction). Thus, the plating film 105 (300 nm in thickness) of nickel iron cobalt alloy was deposited on the seed film 104 in the openings 103K1 and 103K2. In this case, a deposit thickness of the plating film 105 during application period was 100 nm in the magnetic field FV and 200 nm in the magnetic field FP. Next, using CMP, the plating film 105 and the seed film 104 were polished until the photoresist pattern 103 was exposed. In the CMP process, foamed polyurethane pad and alumina slurry (grain diameter: 250 nm) were used. Finally, using acetone, the photoresist pattern 103 was removed with dissolution and the magnetic pole portion layer 12 of the plating film 105 was completed.

Example 2

In the example 2, the same steps as in the example 1 were taken except a use of iron cobalt alloy and nickel iron cobalt alloy as materials of the plating film 105 when applying the magnetic fields FV and FP, respectively.

COMPARATIVE EXAMPLE 1

In the comparative example 1, the same steps as in the example 1 were taken except that the plating film 105 was deposited while applying only the magnetic field FP.

COMPARATIVE EXAMPLE 2

In the comparative example 2, the same steps as in the example 2 were taken except that the plating film 105 was deposited while applying only the magnetic field FP.

The results in Table 1 are derived from an examination for stability of recording operation of the thin film magnetic head in the examples 1 and 2, and the comparative examples 1 and 2. Table 1 shows occurrence of pole erasure and indicates materials of the magnetic pole portion layer 12, the application direction of the magnetic field and the defect rate (%). Here, a term "pole erasure" means a phenomenon that information recorded in a magnetic recording medium is unintentionally erased by a thin film magnetic head in non-recording (no electrical input) state. For examination of occurrence of pole erasure, information was recorded on a specific sector A on the magnetic recording medium. Then the thin film magnetic head (the magnetic pole portion layer 12 magnetized compulsorily) with no electrical input that had been subjected to recording at the other sector B was passed 500 times on the sector A with usual levitation height. Reproduction signal intensity of the sector A was measured to calculate the defect rate as a decreasing rate of the reproduction signal intensity as (reproduction signal intensity after passing 500 times/reproduction signal intensity before passing 500 times)×100. In this case, the test conditions were as follows: the effective recording track width was 220 nm; the recording frequency was 180 $MH_z$; the recording current (zero-peak) was 30 mA; the effective reproducing track width was 110 nm; the reproduction voltage was 120 mV; and the maintenance of the magnetic recording medium was $4000\times10^3(4\pi)$A/m(=4000 Oe). In the examples 1 and 2, and the comparative examples 1 and 2, the structural conditions of the thin film magnetic head were the same except regarding the magnetic pole portion layer 12.

TABLE 1

| | Material of magnetic pole portion layer | | Application direction of magnetic field | Defect rate (%) |
|---|---|---|---|---|
| Example 1 | NiFeCo | | FV→FP | 25 |
| Example 2 | FeCo | NiFeCo | FV→FP | 10 |
| Comparative example 1 | NiFeCo | | FP | 50 |
| Comparative example 2 | FeCo | NiFeCo | FP | 30 |

From the result in Table 1, the following was understood. When nickel iron cobalt alloy was used as a material of the magnetic pole portion layer 12, the defect rate was 25% in the example 1 and 50% in the comparative example 1. The defect rate was smaller in the example 1 in comparison with the comparative example 1. When iron cobalt alloy and nickel iron cobalt alloy were used as materials of the magnetic pole portion layer 12, the defect rate was 10% in the example 2 and 30% in the comparative example 2. The defect rate was smaller in the example 2 in comparison with the comparative example 2. Therefore, in the method of manufacturing the magnetic device according to the present invention, the magnetic pole portion layer 12 is formed using the method of forming the plating film in the present invention so that the magnetic properties in the magnetic pole portion layer 12 are improved, and the pole erasure hardly occurs.

The present invention is explained with the embodiments and examples, but it is not limited to these aspects explained in the embodiments and examples as various modifications are available. For example, in the embodiment, the opening 103K1 with the aspect ratio (depth/width) greater than 1 and the opening 103K2 with the aspect ratio smaller than the opening 103K1 are connected, but it is not necessarily limited to this. The openings 103K1 and 103K2 may be separated with each other if the plating film 105 is deposited in parallel in the openings 103K1 and 103K2. In this case, the same effects as that in the above embodiment can also be obtained.

In the above embodiment, a case is explained where the method of manufacturing the magnetic device according to the present invention is applied to the method of manufacturing the thin film magnetic head, but it is not necessarily limited to this. It is applicable to magnetic devices other than the thin film magnetic head as long as the magnetic film having the high aspect ratio (thickness/width) portion and the low aspect ratio portion is provided. Other magnetic devices with this kind of magnetic film are, for example, Magnetice Random Access Memory (MRAM) having a magnetic yoke and the thin film inductor having the magnetic film to improve inductance. In these cases, the same effects as in the embodiments can be obtained.

The method of forming the plating film according to the present invention is applicable to the method of manufacturing the magnetic device such as a perpendicular magnetic recording head.

Obviously many modifications and variations of the present invention are possible in the light of the above teachings. It is therefore to be understood that within the scope of the appended claims the invention may be practiced otherwise than as specifically described.

What is claimed is:

1. A method of forming a plating film comprising:
a first step of forming a pattern film on a surface of a substrate, the pattern film having a first opening with an aspect ratio, which is a ratio of depth to width, greater than 1 and a second opening with an aspect ratio smaller than that of the first opening;
a second step of forming a seed film so as to cover at least an exposed surface of the substrate in the first and the second openings and inner walls of the pattern film in the first and the second openings; and
a third step of depositing the plating film of magnetic materials on the seed film in the first and the second openings through a process of filling at least the first opening while applying a magnetic field in the direction intersecting the surface of the substrate and a process of filling at least the second opening while applying a magnetic field in the direction along the surface of the substrate.

2. The method of forming the plating film according to claim 1 further comprising:
a fourth step of planarizing the plating film until at least the pattern film is exposed.

3. The method of forming the plating film according to claim 1,
wherein the third step employs the same magnetic materials for the first opening and the second opening before and after changing an application direction of the magnetic field.

4. The method of forming the plating film according to claim 1, wherein the third step employs different magnetic materials before and after changing the application direction of the magnetic field.

5. The method of forming the plating film according to claim 1,
wherein, in the first step, the inner walls of the pattern film in the first and the second openings are formed to be inclined such that the widths of the first and the second openings gradually increase with a distance from the substrate increases.

6. The method of forming the plating film according to claim 1, wherein the first step comprising steps of:
forming a photoresist film on the surface of the substrate; and
selectively exposing and developing the photoresist film to form the first and the second openings, thereby completing the pattern film.

7. The method of forming the plating film according to claim 1, wherein the first step comprising steps of:
forming a nonmagnetic film, which is other than a photoresist film, on the surface of the substrate; and
selectively etching the nonmagnetic film to form the first and the second openings, thereby completing the pattern film.

8. A method of manufacturing a magnetic device having a magnetic film, the method comprising:
a first step of forming a pattern film on a surface of a substrate, the pattern film having a first opening with an aspect ratio, which is a ratio of depth to width, greater than 1 and a second opening with an aspect ratio smaller than that of the first opening;
a second step of forming a seed film so as to cover at least an exposed surface of the substrate in the first and the second openings and inner walls of the pattern film in the first and the second openings; and
a third step of depositing the plating film of magnetic materials on the seed film in the first and the second openings through a process of filling at least the first opening while applying a magnetic field in the direction intersecting the surface of the substrate and a process of filling at least the second opening while applying a magnetic field in the direction along the surface of the substrate, wherein the magnetic film is formed to have a high aspect ratio portion of the plating film filling the first opening and a low aspect ratio portion of the plating film filling the second opening.

9. A method of manufacturing a perpendicular magnetic recording head with a thin film coil generating a magnetic flux and a magnetic pole layer leading the magnetic flux generated in the thin film coil to a magnetic recording medium, the method comprising:

a first step of forming a pattern film on a surface of a substrate, the pattern film having a first opening with an aspect ratio, which is a ratio of depth to width, greater than 1 and a second opening with an aspect ratio smaller than that of the first opening;

a second step of forming a seed film so as to cover at least an exposed surface of the substrate in the first and the second openings and inner walls of the pattern film in the first and the second openings; and a third step of depositing the plating film of magnetic materials on the seed film in the first and the second openings through a process of filling at least the first opening while applying a magnetic field in the direction intersecting the surface of the substrate and a process of filling at least the second opening while applying a magnetic field in the direction along the surface of the substrate, wherein the magnetic pole layer is formed to have a magnetic pole portion with a high aspect ratio of the plating film filling the first opening and a yoke portion with a low aspect ratio of the plating film filling the second opening.

10. The method of manufacturing the perpendicular magnetic recording head according to claim 9, wherein the plating film is deposited to fill at least the second opening under application of the magnetic field in the direction of recording track width.

* * * * *